(12) United States Patent
Ogata et al.

(10) Patent No.: US 7,413,425 B2
(45) Date of Patent: *Aug. 19, 2008

(54) RESIN SEALING MOLD AND RESIN SEALING METHOD

(75) Inventors: Kenji Ogata, Ogori (JP); Masashi Nishiguchi, Ogori (JP); Yoshihiro Mitsui, Ogori (JP)

(73) Assignee: Dai-Ichi Seiko Co., Ltd., Kyoto (JP)

( * ) Notice: Subject to any disclaimer, the term of this patent is extended or adjusted under 35 U.S.C. 154(b) by 245 days.

This patent is subject to a terminal disclaimer.

(21) Appl. No.: 11/224,943

(22) Filed: Sep. 14, 2005

(65) Prior Publication Data

US 2006/0013908 A1   Jan. 19, 2006

Related U.S. Application Data

(63) Continuation of application No. 10/149,613, filed as application No. PCT/JP00/08842 on Dec. 14, 2000, now Pat. No. 7,008,575.

(30) Foreign Application Priority Data

| Dec. 16, 1999 | (JP) | ................................. 11-357381 |
| Dec. 24, 1999 | (JP) | ................................. 11-366895 |
| Nov. 20, 2000 | (JP) | ............................. 2000-352644 |

(51) Int. Cl.
*B29C 45/14* (2006.01)
*H01L 21/56* (2006.01)

(52) U.S. Cl. ..................... 425/121; 425/125; 425/129.1

(58) Field of Classification Search ................ 425/116, 425/125, 121, 129.1, 544

See application file for complete search history.

(56) References Cited

U.S. PATENT DOCUMENTS

| 4,372,740 A | 2/1983 | Kuramochi et al. |
| 4,599,062 A | 7/1986 | Konishi |
| 4,779,835 A | 10/1988 | Fukushima et al. |
| 5,158,780 A | 10/1992 | Schraven et al. |
| 5,326,243 A | 7/1994 | Fierkens |
| 5,366,368 A | 11/1994 | Jang |
| 5,435,953 A | 7/1995 | Osada et al. |
| 5,507,633 A | 4/1996 | Osada et al. |
| 5,560,939 A | 10/1996 | Nakagawa et al. |
| 5,989,471 A | 11/1999 | Lian et al. |
| 6,050,802 A | 4/2000 | Kobayashi |
| 6,071,457 A * | 6/2000 | Bednarz et al. ......... 264/272.17 |

FOREIGN PATENT DOCUMENTS

| CN | 1226340 A | 8/1999 |
| DE | 19529352 A | 2/1997 |
| EP | 0 339 642 A2 | 11/1989 |
| JP | 54-23705 B | 8/1979 |

(Continued)

*Primary Examiner*—Robert B Davis
(74) *Attorney, Agent, or Firm*—Birch, Stewart, Kolasch & Birch, LLP

(57) ABSTRACT

A resin sealing mold for semiconductor devices, which is designed to thoroughly accommodate board thickness variations and prevent formation of burrs and which is easy to maintain. To this end, a plurality of pistons (42) supporting, at one of their respective ends, lower mold cavities (56) have the other ends thereof slidably inserted in hydraulic cylinder blocks installed on lower mold sets (40).

20 Claims, 28 Drawing Sheets

FOREIGN PATENT DOCUMENTS

| | | |
|---|---|---|
| JP | 59-055711 A | 3/1984 |
| JP | 59-125631 A | 7/1984 |
| JP | 60-21225 A | 2/1985 |
| JP | 60-97815 A | 5/1985 |
| JP | 62-56111 A | 3/1987 |
| JP | 63-183824 A | 7/1988 |
| JP | 1-127304 A | 5/1989 |
| JP | 1-275111 A | 11/1989 |
| JP | 2-187041 A | 7/1990 |
| JP | 3-292117 A | 12/1991 |
| JP | 6-84985 A | 3/1994 |
| JP | 6-166046 A | 6/1994 |
| JP | 6-182803 A | 7/1994 |
| JP | 6-198694 A | 7/1994 |
| JP | 6-204379 A | 7/1994 |
| JP | 7-4899 Y | 2/1995 |
| JP | 7-148770 A | 6/1995 |
| JP | 7-308934 A | 11/1995 |
| JP | 7-314491 A | 12/1995 |
| JP | 8-276463 A | 10/1996 |
| JP | 9-155912 A | 6/1997 |
| JP | 10-75040 A | 3/1998 |
| JP | 10-135260 A | 5/1998 |
| JP | 10-305439 A | 11/1998 |
| JP | 11-16932 | 1/1999 |
| JP | 11-58435 A | 3/1999 |
| JP | 11-126787 A | 5/1999 |
| JP | 11-233540 A | 8/1999 |
| JP | 2000-37746 A | 2/2000 |
| JP | 2000-190351 A | 7/2000 |
| JP | 2000-326364 A | 11/2000 |
| JP | 2000-332035 A | 11/2000 |
| KP | 1995-0000512 B1 | 1/1995 |

\* cited by examiner

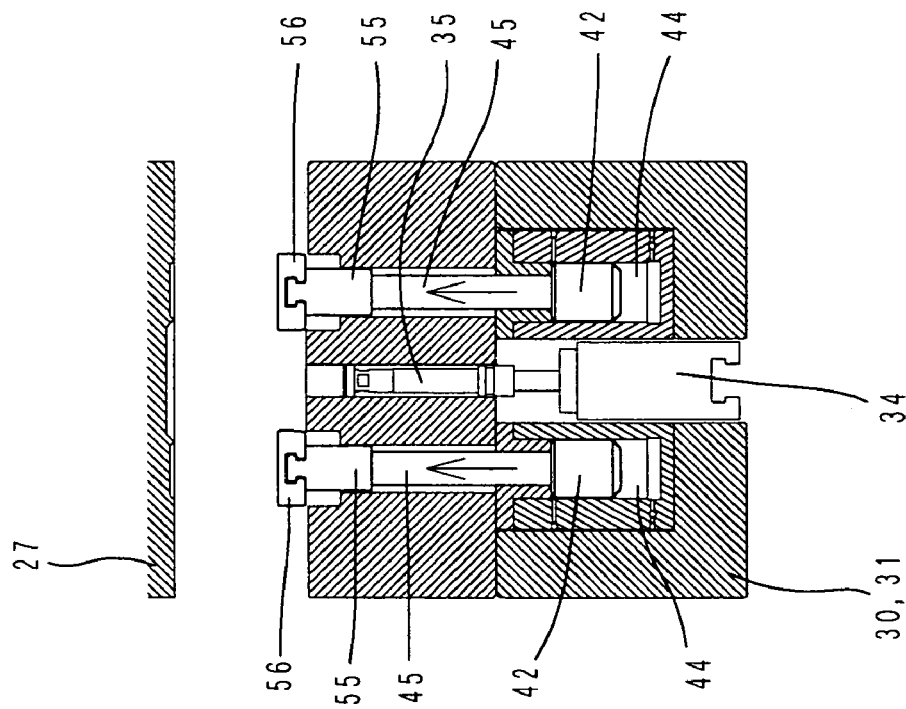
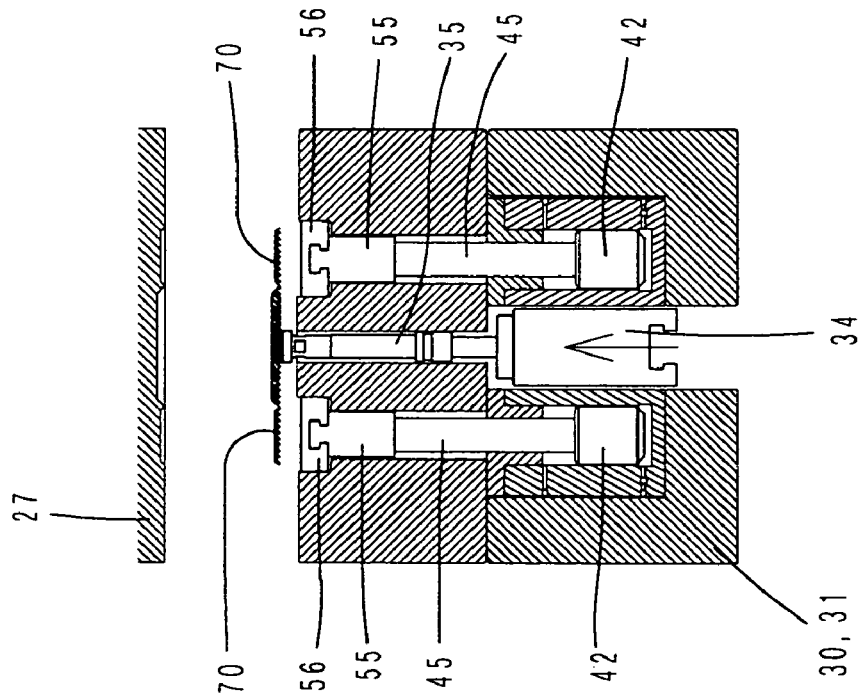
Fig. 8

Fig. 15
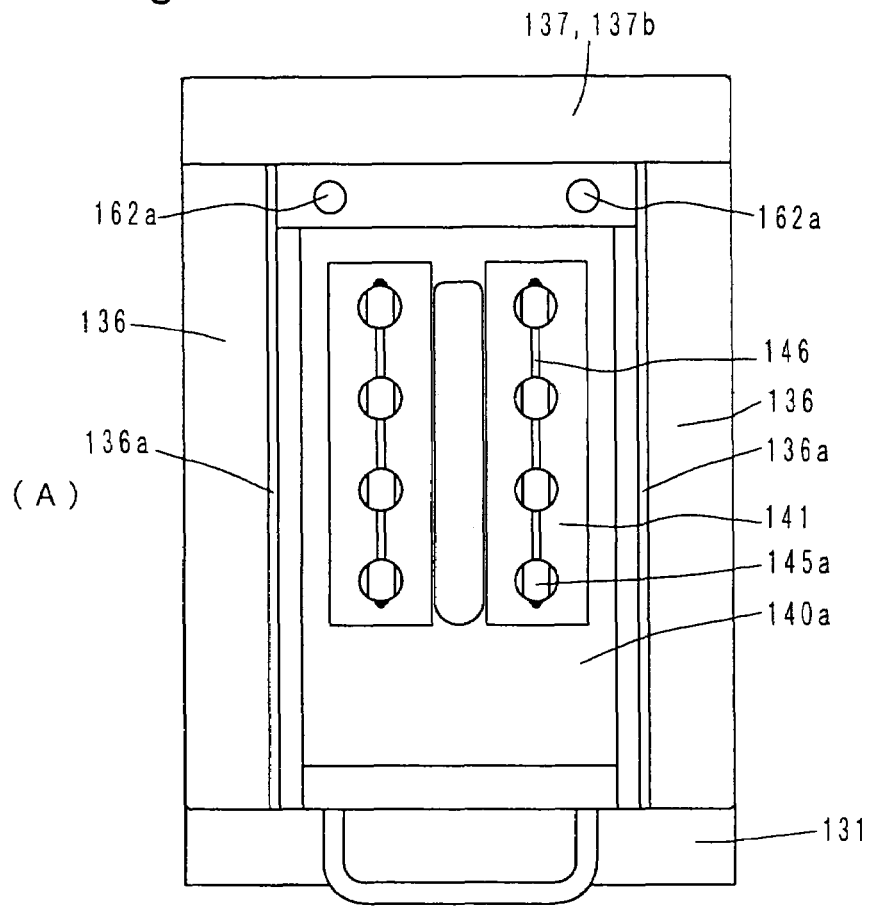
(A)
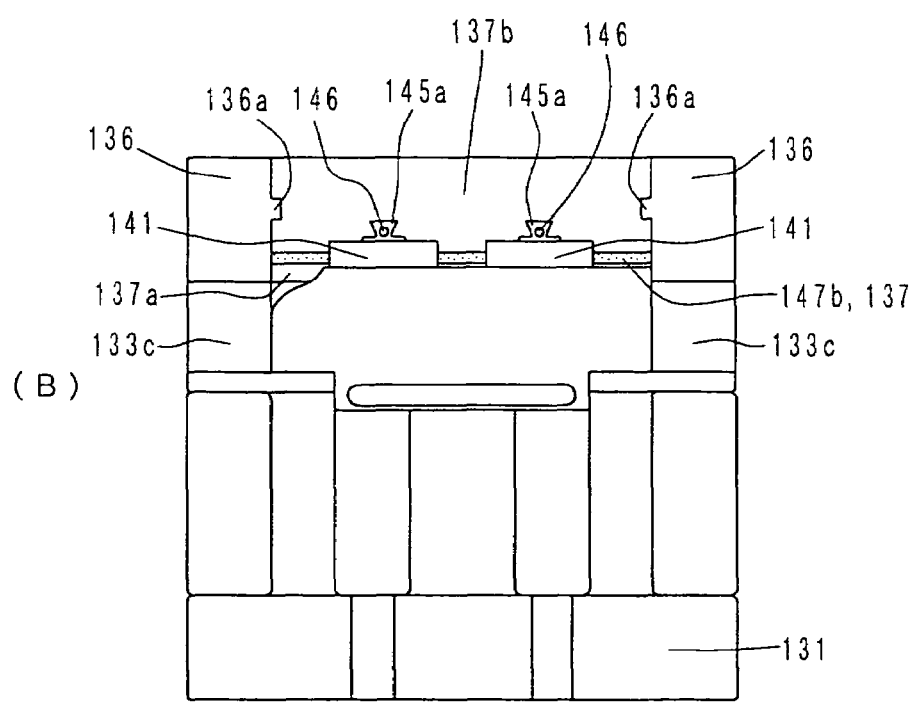
(B)

Fig. 16
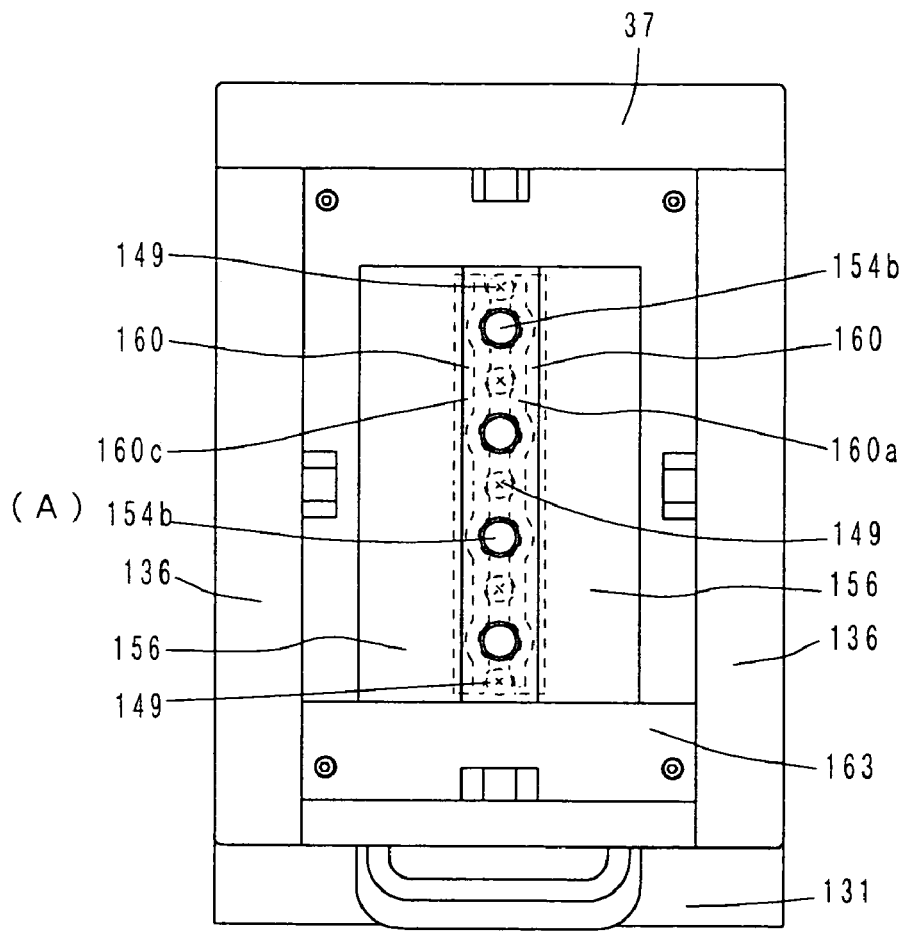
(A)
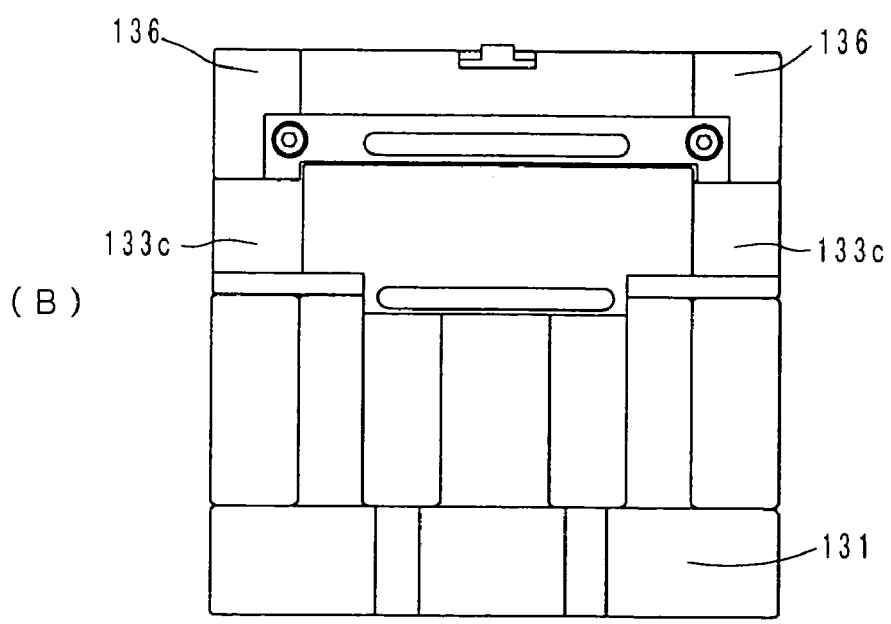
(B)

Fig. 18
(A) 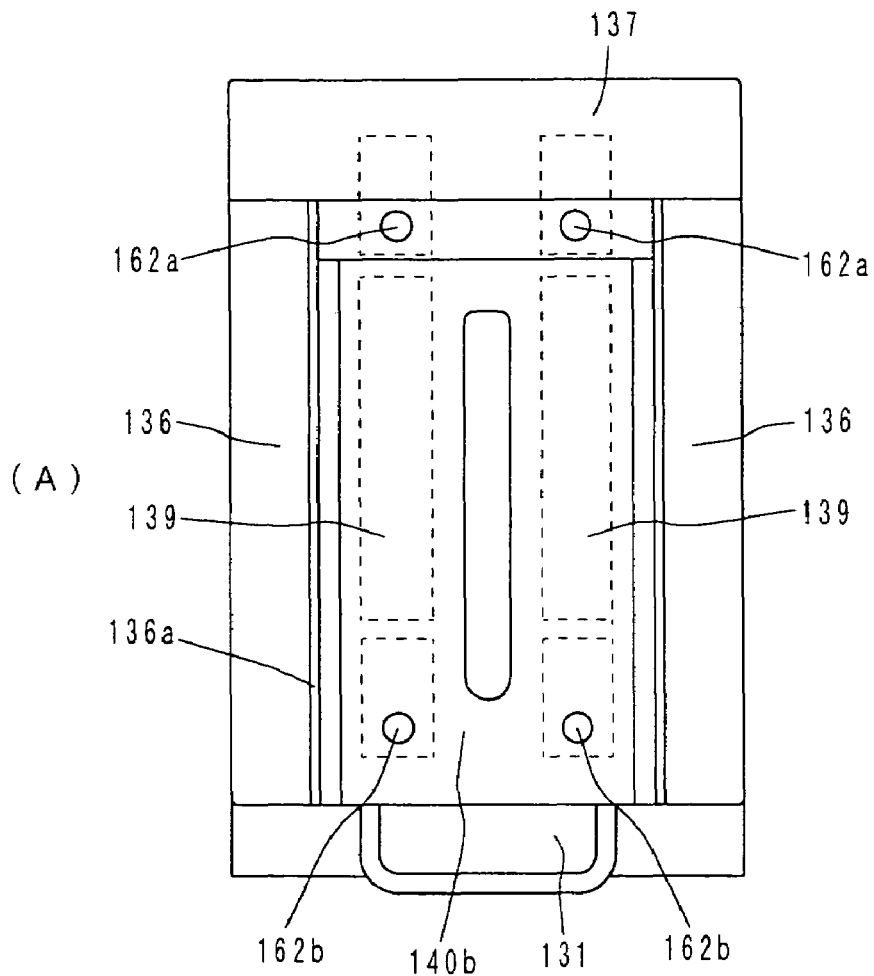
(B) 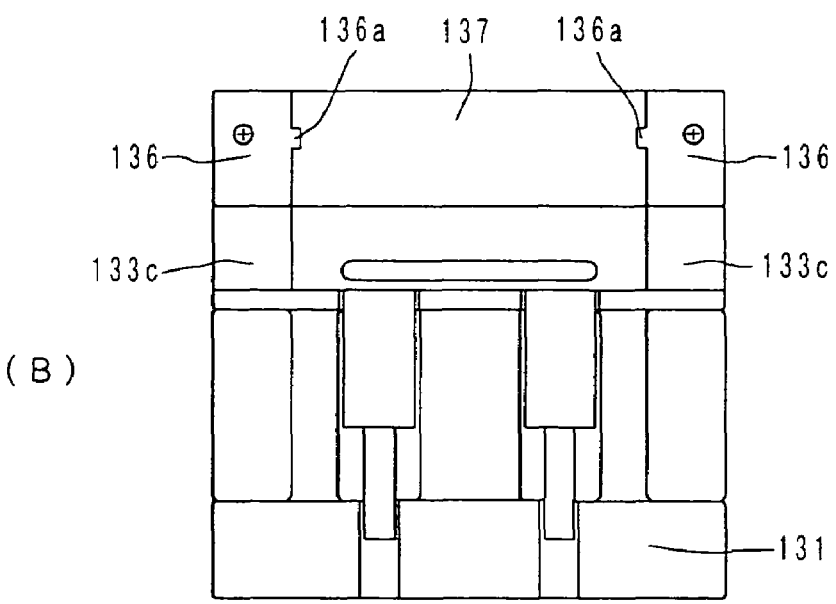

Fig. 25
(A) First resin filling process
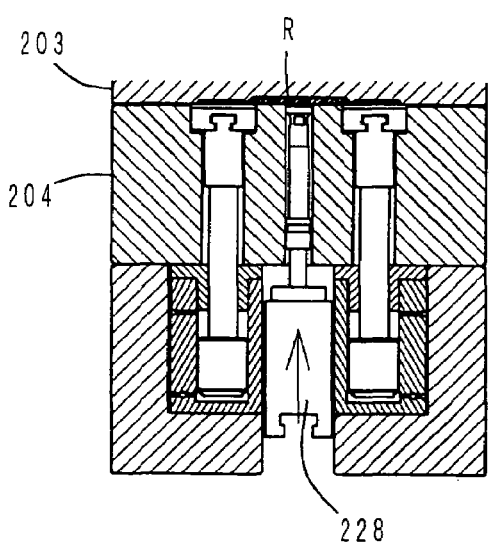
(B) Second clamping process
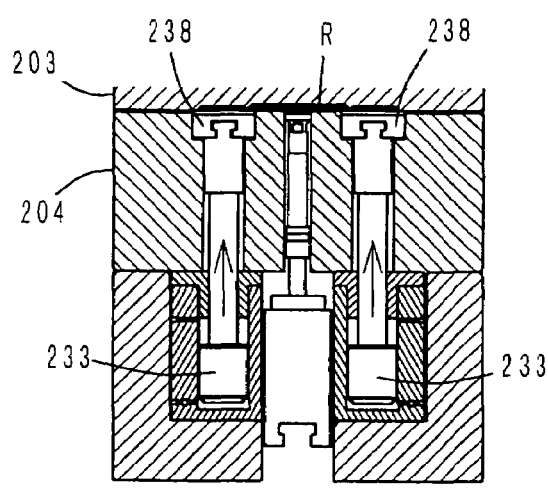
(C) Second resin filling process
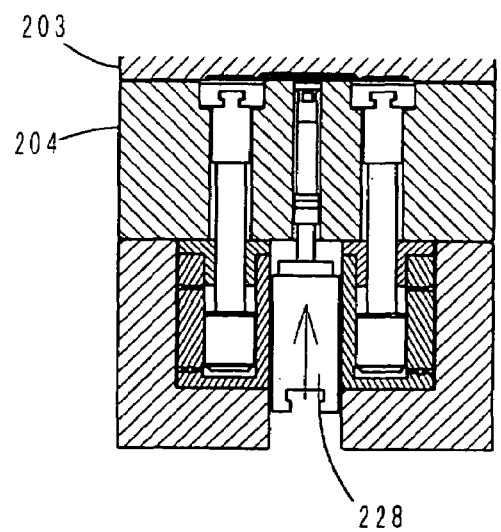
(D) Mold opening process
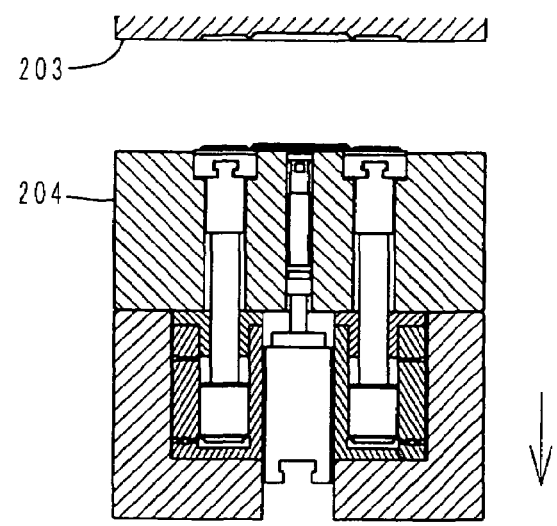

Fig. 26
(A) Product ejecting process
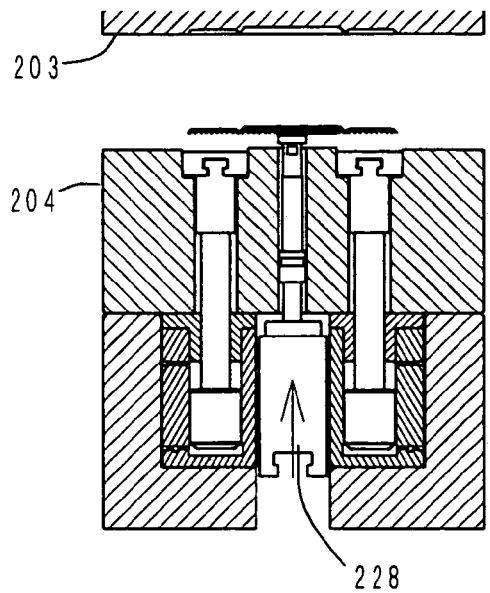
(B) Maintanance
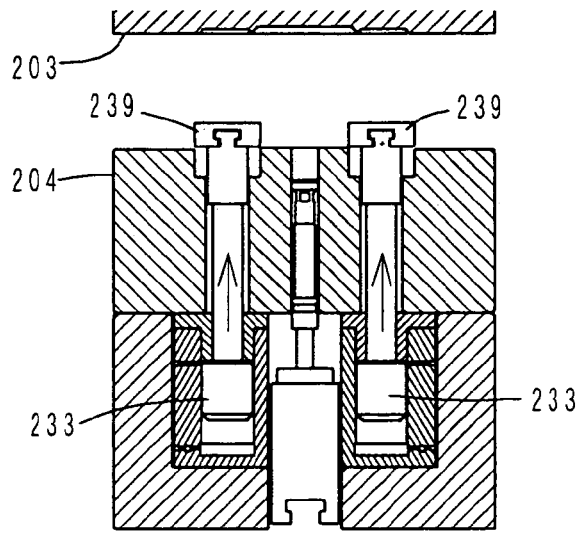
Fig. 27
(A)
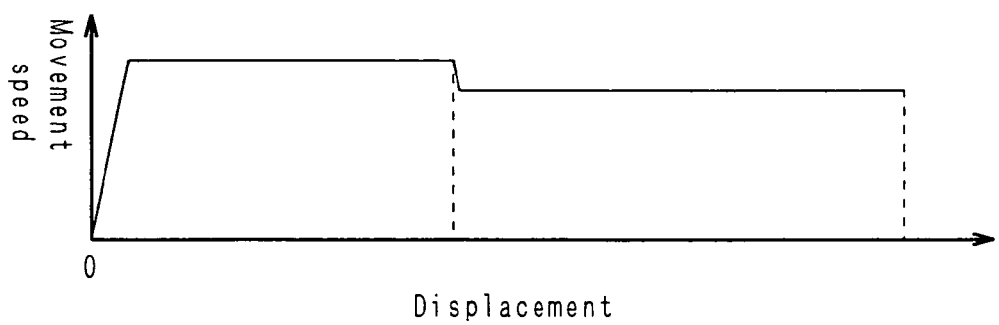
(B)
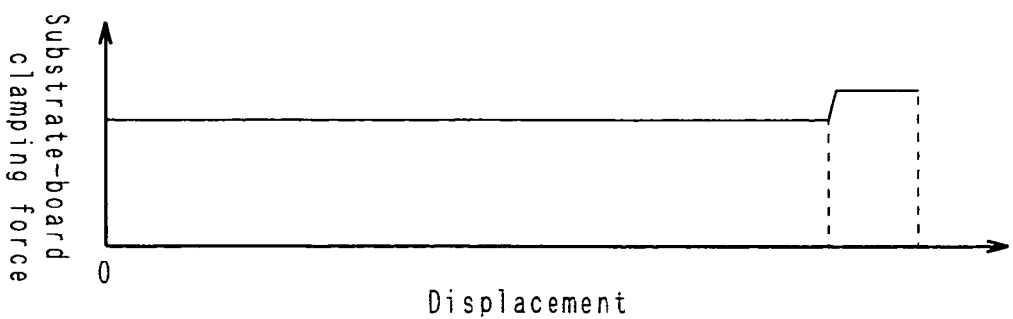

RESIN SEALING MOLD AND RESIN SEALING METHOD

This application is a Continuation of application Ser. No. 10/149,613 filed on Jun. 14, 2002 now U.S. Pat. No. 7,008,575 and for which priority is claimed under 35 U.S.C. § 120. Application Ser. No. 10/149,613 is the national phase of PCT International Application No. PCT/JP00/08842 filed on Dec. 14, 2000 under 35 U.S.C. § 371. The entire contents of each of the above-identified applications are hereby incorporated by reference.

TECHNICAL FIELD

The present invention relates to a mold apparatus for resin encapsulation used for encapsulating an electronic component such as a semiconductor device, and in particular, to a mold apparatus for resin encapsulation and a method of resin encapsulation used for encapsulating an electronic component disposed on at least one side of a plastic substrate board.

BACKGROUND ART

FIG. 29 shows a prior art example of a mold apparatus for resin encapsulation of an electronic component such as a semiconductor device. The apparatus comprises: an upper mold set 1 involving an upper chase 2; and a lower mold set 3 involving a lower chase 4. The lower mold set 3 is pushed up, whereby this lower mold set 3 is pressed and clamped against the upper mold set 1. A substrate board 7 is thereby sustained between cavity bars 5 installed in the lower surface of the upper chase 2 and cavity bars 6 installed in the upper surface of the lower chase 4. Then, a plunger 3a is ejected by a driving mechanism which is not shown in the figure, whereby a solid tablet 8 in a pot 3b undergoes a heating compression to fluidify, and whereby an electronic component (not shown) mounted on the surface of said substrate board 7 is encapsulated with resin. In said mold apparatus, the variation (maximum 0.02 mm) of thickness among metallic substrate boards 7, such as lead frames, has been compensated by the elastic deformation of elastic pins 2a in the axial direction. Further, numeral 9 designates a support block constituting said lower mold set 3.

However, the needs for resin encapsulation of plastic substrate boards, such as so-called substrates, have been growing in recent years. The variation (maximum 0.2 mm) of thickness among plastic substrate boards is generally much larger than that among metallic substrate boards. Such variation of board thickness is difficult to be compensated completely by said elastic pins 2a having a small capacity for elastic deformation. Therefore, a gap is unavoidable to occur, thereby causing a flash frequently. In addition to this incapability, the increase of the displacement causes said elastic pins 2a easily to fatigue failure, thereby requiring an early-stage change, thereby increasing the maintenance work. Further, in the above-mentioned example of the prior art, the elastic pins 2a need a change depending on the substrate board to encapsulate with resin because of the small capacity of the elastic pins 2a for elastic deformation. The change takes a lot of troubles during disassembling and reassembling the mold apparatus. Thus, a method has been proposed to use overlaying such as plural conical belleville springs (not shown) having a larger capacity for elastic deformation than said elastic pins 2a. However, said conical belleville springs have a problem of variation in spring force (recoiling force) and a further problem that the spring force (recoiling force) changes due to the heating compression strokes.

Considering said problems, a first object of the present invention is to provide a mold apparatus for resin encapsulation, which is capable of compensating completely a large variation of thickness mainly among plastic substrate boards, thereby avoiding the occurrence of a flash, and is easy of maintenance.

On the other hand, a mold-clamping force corresponding to the resin encapsulation of a plastic substrate board is insufficient as the mold-clamping force for the resin encapsulation of a metallic substrate board (lead frame and the like). Thus, the metallic substrate board cannot be encapsulated with resin.

For the information, a mold-clamping force of about 1-5 $kg/mm^2$ is sufficient for a plastic substrate board, which can be generated by a small oil hydraulic cylinder capable of being built in the mold apparatus. In contrast, with regard to the mold-clamping force for metallic substrate boards, a copper lead frame needs a mold-clamping force of 20-30 $kg/mm^2$, and a steal lead frame needs a mold-clamping force of 25-40 $kg/mm^2$. Thus, a large mechanism for oil pressure generation is necessary if used, as well as a large cylinder and the like. Therefore, overall system becomes so large as not to be built in the mold apparatus. On the contrary, if a plastic substrate board is applied with a mold-clamping force of the same order as that for a metallic substrate board, the plastic substrate board deforms and eventually breaks in a worst case.

As such, a plastic substrate board and a metallic substrate board can not been capsulated by common mold sets, and each substrate board requires exclusive mold sets and chases. Thus, there have been a problem of increased cost and a problem of a lot of time necessary for the change thereof.

Considering said problems, a second object of the present invention is to provide a mold apparatus for resin encapsulation, capable of processing not only a plastic substrate board but also a metallic substrate board.

Further, when a plastic substrate board is clamped indiscriminately with a strong clamping force, the plastic substrate board is easily deformed, and hence, assembled components, such as semiconductor devices and especially wires, are easily damaged. On the contrary, when said substrate board is clamped indiscriminately with so weak a clamping force as not to cause a deformation, a gap occurs between the substrate board and the mold, causing a problem of the unavoidable occurrence of a flash.

A third object of the present invention is to provide a method of resin encapsulation and a mold apparatus for resin encapsulation, capable of simultaneously resolving the two problems of the damage to an mounted component and of the occurrence of a flash.

DISCLOSURE OF INVENTION

In order to achieve the first object, in a mold apparatus for resin encapsulation, wherein a substrate board is clamped by both an upper mold disposed in the lower surface of an upper mold set and a lower mold disposed in the upper surface of a lower mold set, wherein a plunger provided in any one of said mold sets is extruded whereby solid resin for encapsulation is fluidified, and wherein an electronic component mounted on the surface of said substrate board is encapsulated with the resin, a mold for resin encapsulation of a semiconductor device in accordance with the present invention is configured so that any one of said molds is supported by a plurality of pistons provided in parallel and that said pistons are inserted slidably within an oil hydraulic cylinder block provided in said mold set.

In accordance with the present invention, even when the variation in thickness of substrate boards to encapsulate is large, the variation in thickness is compensated by the movement of the pistons sliding up and down within the oil hydraulic cylinder block. Accordingly, no gap occurs between the cavity and the substrate board, and the press is carried out under a constant pressure. Therefore, the occurrence of a flash is avoided, and hence the yield rate of encapsulated products is improved.

In a mold apparatus for resin encapsulation, wherein a substrate board is clamped by both an upper mold disposed in the lower surface of an upper mold set and a lower mold disposed in the upper surface of a lower mold set, wherein a plunger provided in the lower mold set is extruded whereby solid resin for encapsulation is fluidified, and wherein an electronic component mounted on the surface of said substrate board is encapsulated with the resin, an embodiment of the present invention may be configured so that said lower mold is supported by plural pistons provided in parallel and that the lower end sections of said pistons are inserted slidably within an oil hydraulic cylinder block provided in said lower mold set.

As such, in accordance with the present invention, similarly to the above-mentioned configuration, even when the variation in thickness of substrate boards is large, the variation is compensated by the movement of the lower end sections of the pistons sliding within the oil hydraulic cylinder block. Accordingly, no gap occurs between the substrate board and the upper mold or the lower mold, and the press is carried out under a constant pressure. Therefore, the occurrence of a flash is avoided.

In one embodiment of the present invention, an oil hydraulic cylinder block may be clamped by a base plate and a base plate for chase constituting the top and the bottom of a lower mold set.

In the prior art, a support block for supporting the center section of the base plate for chase has been provided between the base plate and the base plate for chase. In contrast, in accordance with the present invention, said oil hydraulic cylinder block can serve also the function of the support block without a considerable increase in the number of components.

In another embodiment, said lower mold supported by the pistons may be attachable onto and detachable from the upper surface of said lower mold set.

In accordance with this embodiment, the mold can be easily removed for cleaning, and the maintenance becomes simple.

In another preferable embodiment, said plural pistons provided in parallel may be linked by a synchronization bar. As a result, no time lag occurs in the operation of the pistons, and the response is much improved. Thus, the mold is pushed up simultaneously, and hence the operation is carried out on the level without slanting or deforming. Therefore, the yield rate of encapsulated products is improved.

Each of plural pistons provided in parallel and a base plate supporting the middle sections of the pistons and constituting a lower mold set may be provided with respective through holes, for operation check, capable of communicating in a common straight line.

In this embodiment, when the through holes for operation check of the pistons are not located in the same line as the through hole for operation check of the base plate, the light to pass through said through holes is interrupted, thereby indicating the occurrence of an abnormal event such as a jam. As such, the state of operation can be checked via said through hole, which makes the situation safe and convenient.

In another embodiment, a guiding mechanism section comprising: an up-down movable block moving downwardly by being pressed by the lower surface of an upper mold set; and a guiding block moving sidewardly to a guiding position of said lower mold by being pressed by the tapered surface of the up-down movable block; for guiding a lower mold with said guiding block during the mold clamping and for releasing said guiding block during the mold opening may be disposed in the vicinity of an outward surface of said lower mold installed to said lower mold set, that is, in the sideward and push-pull direction.

In this embodiment, the guiding block is positioned in the guiding position only during the mold clamping. Thus, no scuffing occurs on the guiding block, thereby resulting in the effect of avoiding possible damage to a component.

In order to achieve the second object, in a mold apparatus for resin encapsulation, wherein a substrate board is clamped by both an upper mold disposed in the lower surface of an upper mold set and a lower mold disposed in the upper surface of a lower mold set, wherein a plunger provided in any one of said mold sets is extruded whereby solid resin for encapsulation is fluidified, and wherein an electronic component mounted on the surface of said substrate board is encapsulated with the resin, a mold apparatus for resin encapsulation in accordance with the present invention is configured so that an oil hydraulic cylinder block to which one end of each of plural pistons supporting any one of said molds is inserted slidably is provided in any one of said upper mold set and said lower mold set so as to be changeable with a normal base block.

In a mold apparatus for resin encapsulation, wherein a substrate board is clamped by both an upper mold disposed in the lower surface of an upper mold set and a lower mold disposed in the upper surface of a lower mold set, wherein a plunger provided in any one of said mold sets is extruded whereby solid resin for encapsulation is fluidified, and wherein an electronic component mounted on the surface of said substrate board is encapsulated with the resin, the present invention may be configured so that an oil hydraulic cylinder block to which one end of each of plural pistons supporting said lower mold is inserted slidably is provided in said lower mold set so as to be changeable with a normal base block comprising an ejector rod.

Further, in an embodiment of the present invention, an apparatus may be configured so that an oil hydraulic cylinder block is slidably engaged to a base plate for chase constituting a lower mold set so as to be changeable with a normal base block comprising an ejector rod.

Further, an apparatus may be configured so that an oil hydraulic cylinder block is slidably engaged to a base plate constituting an upper mold set so as to be changeable with a normal base block.

Said normal base block may be separable into plural small blocks.

In accordance with the present invention, even when the variation in thickness of substrate boards large, it is compensated by the movement of said pistons sliding within the oil hydraulic cylinder block. Accordingly, no gap occurs between the mold and the substrate board, and the press is carried out under a constant pressure. Therefore, the occurrence of a flash is avoided.

Further, only by changing the oil hydraulic cylinder block with the normal base block or the normal base block comprising an ejector rod, a metallic substrate board can be encapsulated with resin as well as a plastic substrate board. As such, it is unnecessary to change the overall mold set with a exclusive mold set for metallic substrate boards, which permits a considerable reduction of time for component change. It is also obviously unnecessary to purchase a mold apparatus for resin encapsulation dedicated for metallic substrate boards.

In an embodiment of the present invention, an apparatus may be configured so that a heat insulating plate is disposed in at least one linkage section between a lower mold and a space block, a side block, or an end block constituting a lower mold set. Further, an apparatus may be configured so that a heat insulating plate is disposed in at least one linkage section between a lower mold and a space block, a support block, or a piston of a lower chase.

In accordance with the present embodiment, the temperature rise of the oil and the like in a cylinder block can be suppressed, whereby a stable pressure can be supplied and the deterioration of the oil and the like due to high temperature can be prevented.

In another embodiment of the present invention, an apparatus may be configured so that a lower chase involving a lower mold is slidably engaged to a lower mold set so as to be attachable thereto and detachable therefrom.

In accordance with this embodiment, the mold can be easily removed for cleaning, and the maintenance becomes simple.

In an embodiment of the present invention, an apparatus may be configured so that plural pistons provided in parallel are linked by a synchronization bar.

In accordance with the present embodiment, a mold is pushed up simultaneously, and hence the operation is carried out keeping the level. Thus, no time lag occurs in the operation of the pistons, and the response is much improved. Further, without slanting or deforming of the mold, the yield rate of encapsulated products is improved.

In another embodiment of the present invention, an apparatus may be configured so that a heater is disposed in the vicinity of a pot into which solid resin for encapsulation is put.

In accordance with the present embodiment, the solid resin is supplied with a constant heat, which stabilizes the encapsulation condition of the resin, which causes the effect that encapsulated products with a stable quality can be provided and that the yield rate is improved.

In order to resolve the above-mentioned third problem, in a method of resin encapsulation, wherein a plastic substrate board is clamped between a fixed side mold and a movable side mold, and wherein resin is filled into the formed cavity, thereby encapsulating an mounted component on the surface of said substrate board with the resin, a method of the present invention comprises: a first clamping step of clamping said substrate board with said both molds using a force of a strength not causing a trouble to the mounted component due to the deformation of said substrate board; a first resin filling step of filling the resin into a cavity formed by said both molds to an extent that the mounted component is almost covered; a second clamping step of clamping the member to be clamped, with said both molds in an ordinary manner; and a second resin filling step of filling the resin completely in the cavity formed by said both molds.

In said first clamping step, the clamping is carried out with a force of 70-80% of the ordinary force. In said first resin filling step, the resin is filled by an amount of 80-90% of the complete filling.

In order to resolve said problem, in a mold apparatus for resin encapsulation, wherein a plastic substrate board is clamped between a fixed side mold and a movable side mold, and wherein resin is filled into the formed cavity, thereby encapsulating an mounted component on the surface of said substrate board with the resin, an apparatus of the present invention is configured so that at least the area for clamping the plastic substrate board of said movable side mold is constituted of a clamping member movable in the clamping direction and that the apparatus comprises a driving mechanism for moving said clamping member thereby to clamp the plastic substrate board between the both molds with a clamping force of a strength not causing a trouble to the mounted component due to the deformation of said substrate board or an ordinary clamping force.

Said driving mechanism is constituted of a hydraulic pressure generating cylinder mechanism for driving a clamping member by the hydraulic balance between a piston extruding liquid chamber and a piston retracting liquid chamber. A pressure sensor is provided for detecting the hydraulic pressure of the extruding liquid chamber in a hydraulic pressure generating cylinder of the hydraulic pressure generating cylinder mechanism. Said hydraulic pressure generating cylinder mechanism is controlled and driven depending on the pressure detected by said pressure sensor, thereby clamping the plastic substrate board between the both molds with an ordinary clamping force or a clamping force of a strength not causing a trouble to the mounted component due to the deformation.

It is preferable that the oil pressure adjustment of the piston extruding liquid chamber and the piston retracting liquid chamber of said hydraulic pressure generating cylinder is performed independently by respective oil pressure adjusting apparatuses depending on the pressure detected by pressure sensors provided correspondingly to the respective liquid chambers, because the substrate board can be clamped more properly.

In a method of resin encapsulation and a mold apparatus for resin encapsulation in accordance with the present invention, a plastic substrate board is clamped so as not to cause a deformation, and resin is then filled to an extent that an electronic component and a wire extending therefrom are almost covered. This results in an effect that a trouble, such as the elongation and the breakage of a wire, does not occur even when the clamping force is increased in the second clamping step.

BRIEF DESCRIPTION OF DRAWINGS

FIG. 8 is an operation diagram of the mold apparatus, continued from FIG. 7.

FIGS. 15(A) and 15(B) are a plan view and a front view of a lower mold set of a mold apparatus for resin encapsulation in accordance with the present invention, where a cylinder block for pistons is installed.

FIGS. 16(A) and 16(B) are a plan view and a front view of a lower mold set of a mold apparatus for resin encapsulation in accordance with the present invention, where a cylinder block for pistons is installed.

FIGS. 18(A) and 18(B) are a plan view and a front view of a lower mold set of a mold apparatus for resin encapsulation in accordance with the present invention, where a normal base block having ejector rods is installed.

FIG. 24(A) shows the original position state; FIG. 24(B) shows a material supplying state; FIG. 24(C) shows a mold clamping state; and FIG. 24(D) shows a cavity-bar clamping state.

FIG. 25 are process diagrams showing a method of resin encapsulation in accordance with the present embodiment; FIG. 25(A) shows the state of a first resin filling step; FIG. 25(B) shows the state of a second clamping step; FIG. 25(C) shows the state of a second resin filling step; and FIG. 25(D) shows the state of mold opening.

FIG. 26 are process diagrams showing a method of resin encapsulation in accordance with the present embodiment; FIG. 26(A) shows a product ejection state; and FIG. 26(B) shows a maintenance state.

FIG. 27 is a chart of transfer position and substrate-board clamping force.

BEST MODE FOR CARRYING OUT THE INVENTION

Embodiments in accordance with the present invention are described below with reference to the attached drawings of FIGS. 1 to 28.

A mold apparatus for resin encapsulation in accordance with a first embodiment is generally constituted of an upper mold set 10 involving an upper chase 20 and a lower mold set 30 involving a lower chase 50, as shown in FIGS. 1 to 8.

Figure 2:
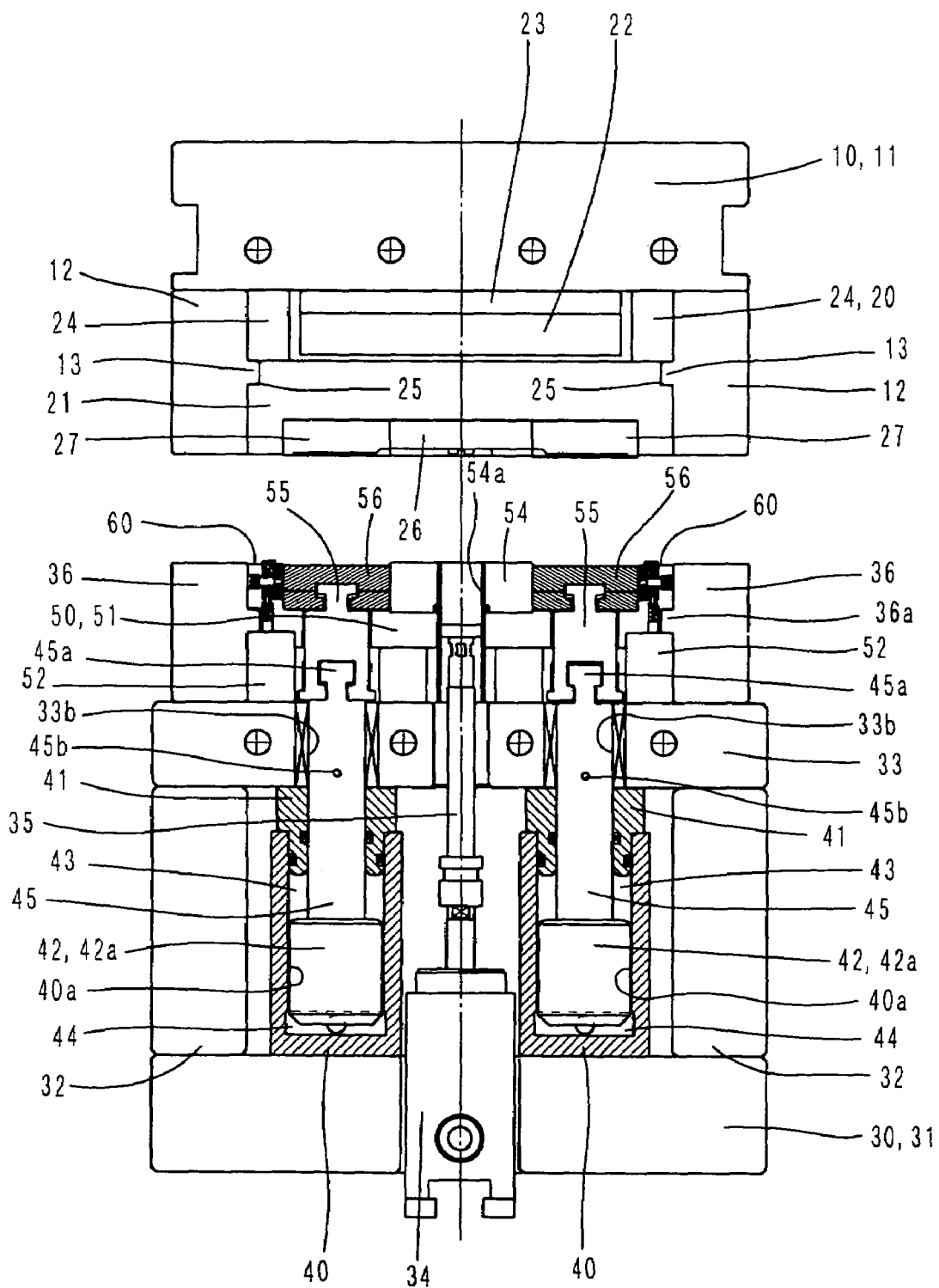
FIG. 2 is a front crossectional view of the mold apparatus shown in FIG. 1.

The upper mold set 10 is configured so that side blocks 12 are disposed in both edge side sections of the lower surface of an upper base plate 11, as shown in FIG. 2. Guiding rails 13,13 are provided on the opposed inward surfaces of said side blocks 12. The upper chase 20 described later can be slidably engaged thereto from the side direction.

Figure 1:
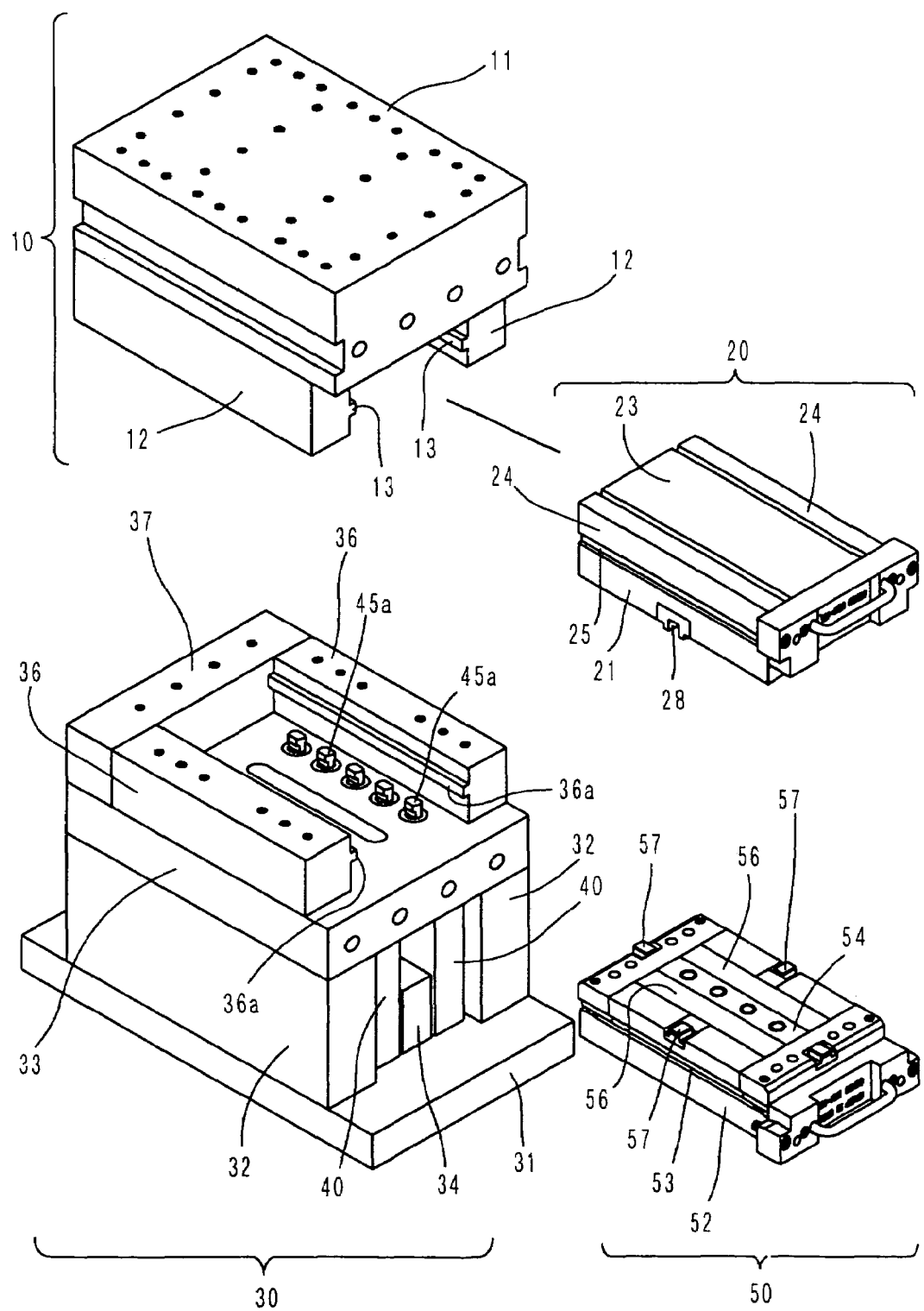
FIG. 1 is an exploded and perspective view showing a first embodiment of a mold apparatus for resin encapsulation in accordance with the present invention.

Said upper chase 20 is configured so that a pin plate 22 and an ejector plate 23 are serially stacked on the center of the upper surface of a holder base plate 21 and that space blocks 24 for chase are disposed on both sides thereof thereby to form engagement guiding grooves 25, as shown in FIGS. 1 and 2. On the other hand, upper cavity bars 27 are disposed on both sides of a cull block 26 disposed on the center of the lower surface of said holder base plate 21. FIG. 1 shows an upper set block 28 for positioning the upper chase 20 relatively to a lower chase 50 described later.

The lower mold set 30 is configured so that a base plate 33 for lower chase is assembled via space blocks 32 disposed in both edge side sections of the upper surface of a lower base plate 31, as shown in FIGS. 1 and 2. An equi-pressure cylinder block 34 for plunger is disposed in the middle of said opposed space blocks 32. In the equi-pressure cylinder block 34 for plunger, the plunger 35 is movable reciprocatingly in the axial direction through a through hole provided in said base plate 33 for lower chase.

Further, as shown in FIG. 1, cylinder blocks 40 for piston are disposed on both sides of the equi-pressure cylinder block 34 for plunger. Side blocks 36 are disposed in both edge side sections of the upper surface of said base plate 33 for lower chase, and an end block 37 is disposed in an end section of the upper surface. Guiding rails 36a, 36a for slidably engaging the lower chase 50 described later are formed in the opposed inward surfaces of said side blocks 36.

In said cylinder block 40 for piston, as shown in FIG. 2, a space 40a sealed by a cylinder cover 41 is separated into an upper liquid chamber 43 and a lower liquid chamber 44 by a skirt section 42 and a packing (not shown) of a piston 42. The upper liquid chamber 43 and the lower liquid chamber 44 are connected through supplying and exhausting openings 43a, 44a (FIG. 3) in communication therewith respectively to an oil hydraulic pump (not shown). The upper end section 45a of a rod 45 extending in the coaxial direction from said piston 42 is extruding from a through hole 33b provided in said base plate 33 for lower chase (FIG. 2). The upper end section 45a of said rod 45 is formed so as to slidably engage with an attach and detach block 55 described later. Further, the upper end section 45a of said rod 45 can be directly engaged with a lower cavity bar 56 without the attach and detach block 55.

Figure 3:
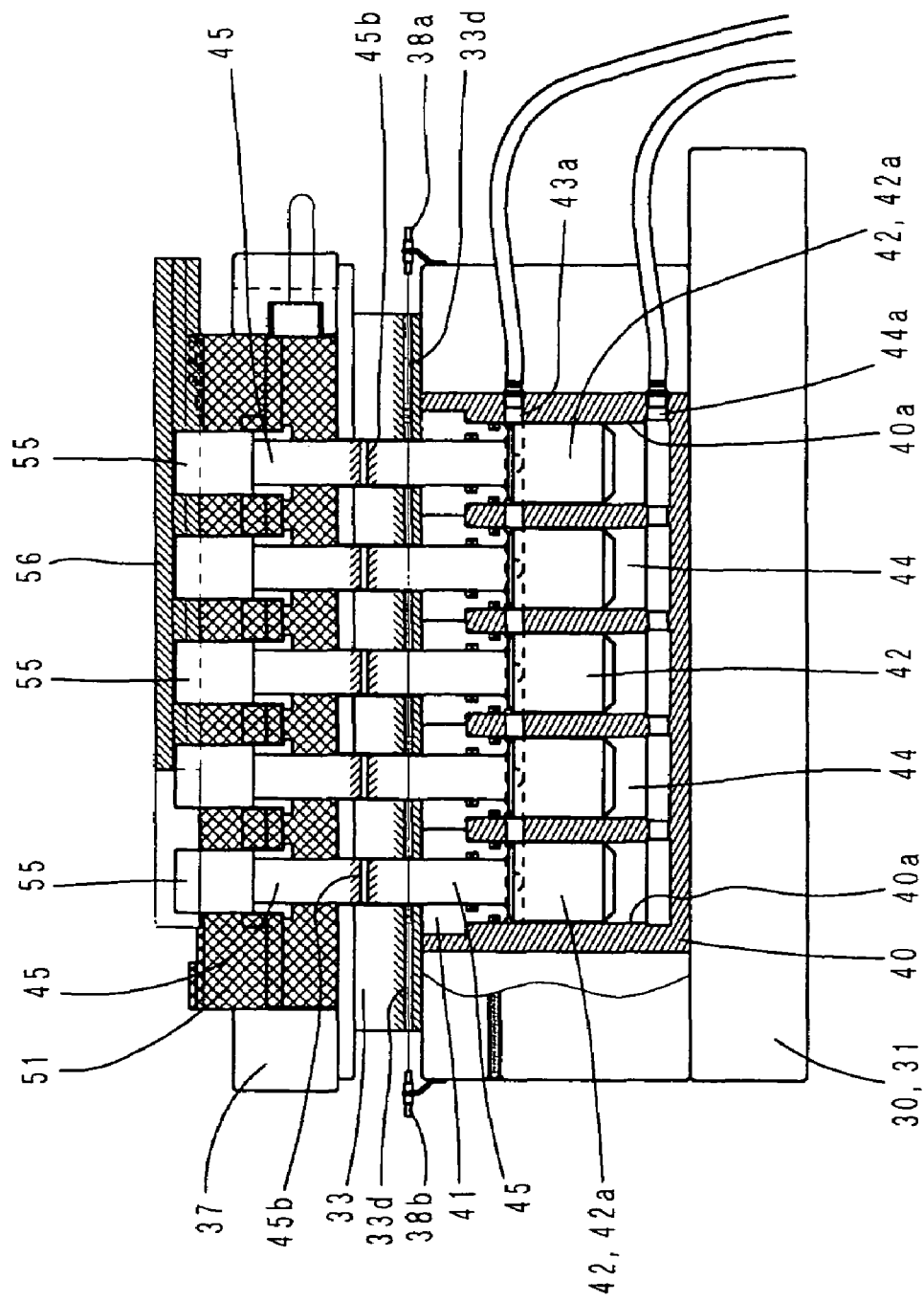
FIG. 3 is a side crossectional view of the mold apparatus shown in FIG. 1.

The rod 45 of the piston 42 and the base plate 33 are provided with through holes 45b, 33d for operation check so as to be communicating in a common straight line, as shown in FIG. 3. A light source 38a of an optical fiber is positioned on one side of the through hole 33d for operation check, and a light sensor 38b is disposed on the other side. Thus, in an abnormal case that the piston 42 can not restore to a predetermined position because of a jam and the like, the light is being interrupted. The light sensor 38b detects this situation, thereby to cause an emergency stop of the driving.

As the lower chase 50 is shown in FIGS. 1 and 2, space blocks 52 are disposed on the both edges of the lower surface of the lower holder base plate 51 which forms guiding grooves 53, and a center block 54 is disposed on the center of the upper surface of the lower holder base plate 51. The center block 54 is provided with through holes 54a in a predetermined pitch, and encapsulation resin tablets inserted into the through holes 54a can be pushed out by said plungers 35. An attach and detach block 55 is disposed on each side of said center block 54 in a position allowing the slidable engagement with the rod 45 of said piston 42. The lower end section of the attach and detach block 55 is slidably engageable with the upper end section 45a of said rod 45, and the upper end section thereof is slidably engaged with a lower cavity bar 56. Further, as described above, the upper end section 45a of the rod 45 can be slidably engaged directly with the lower cavity bar 56.

FIG. 1 shows a lower set block 57 for positioning the upper chase 20 relatively to a lower chase 50.

Figure 4:
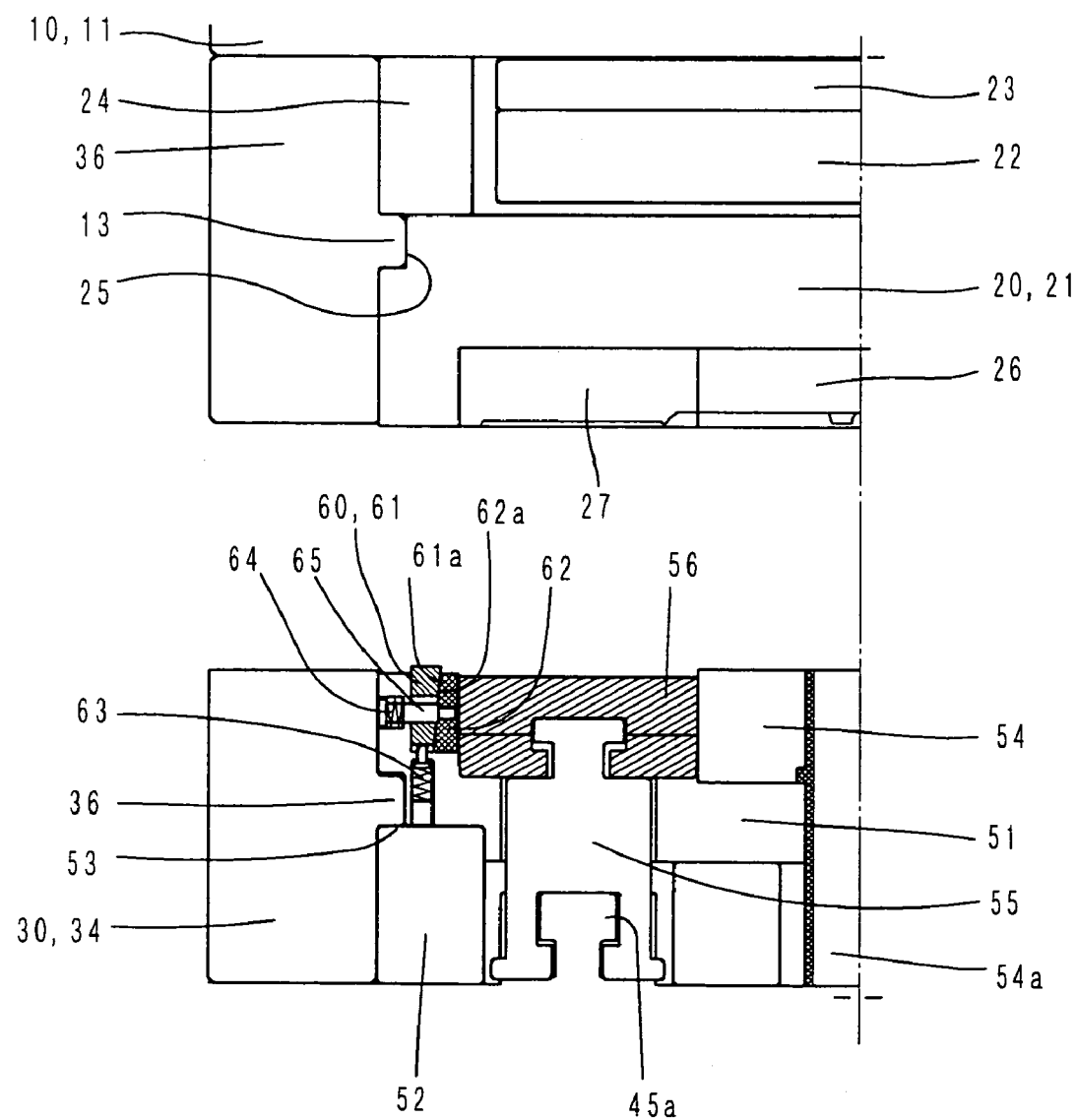
FIG. 4 is a fragmentary front crossectional view of the mold apparatus shown in FIG. 1 before operation.
Figure 5:
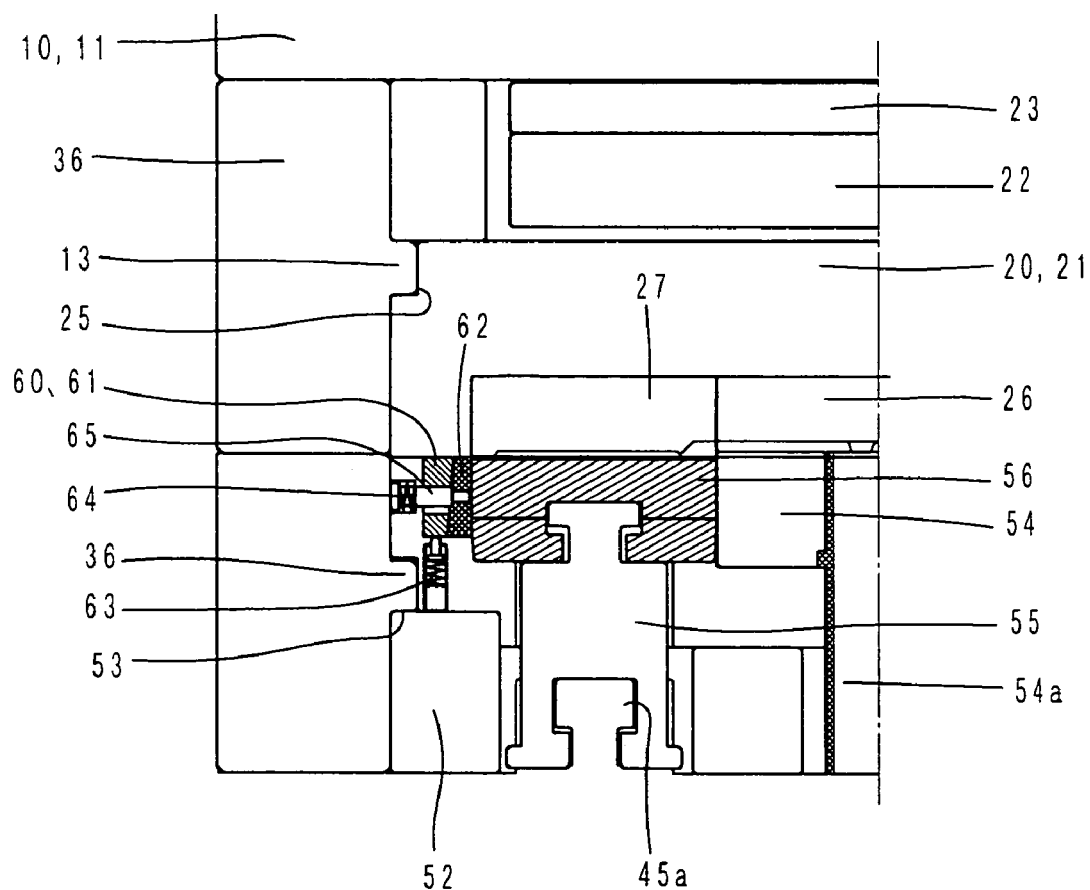
FIG. 5 is a fragmentary front crossectional view of the mold apparatus shown in FIG. 1 after operation.
Figure 6:
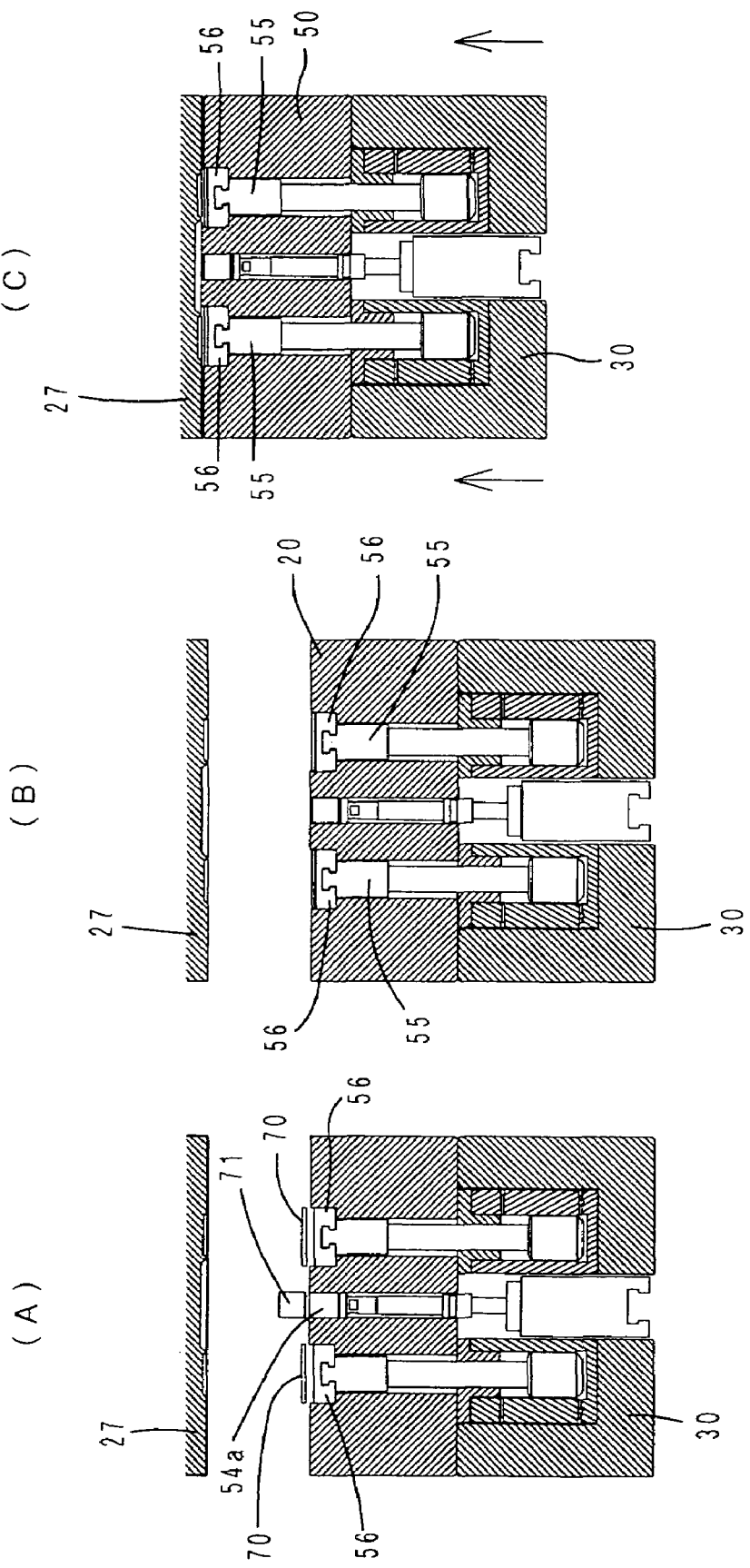
FIG. 6 is an operation diagram of the mold apparatus shown in FIG. 1.
Figure 7:
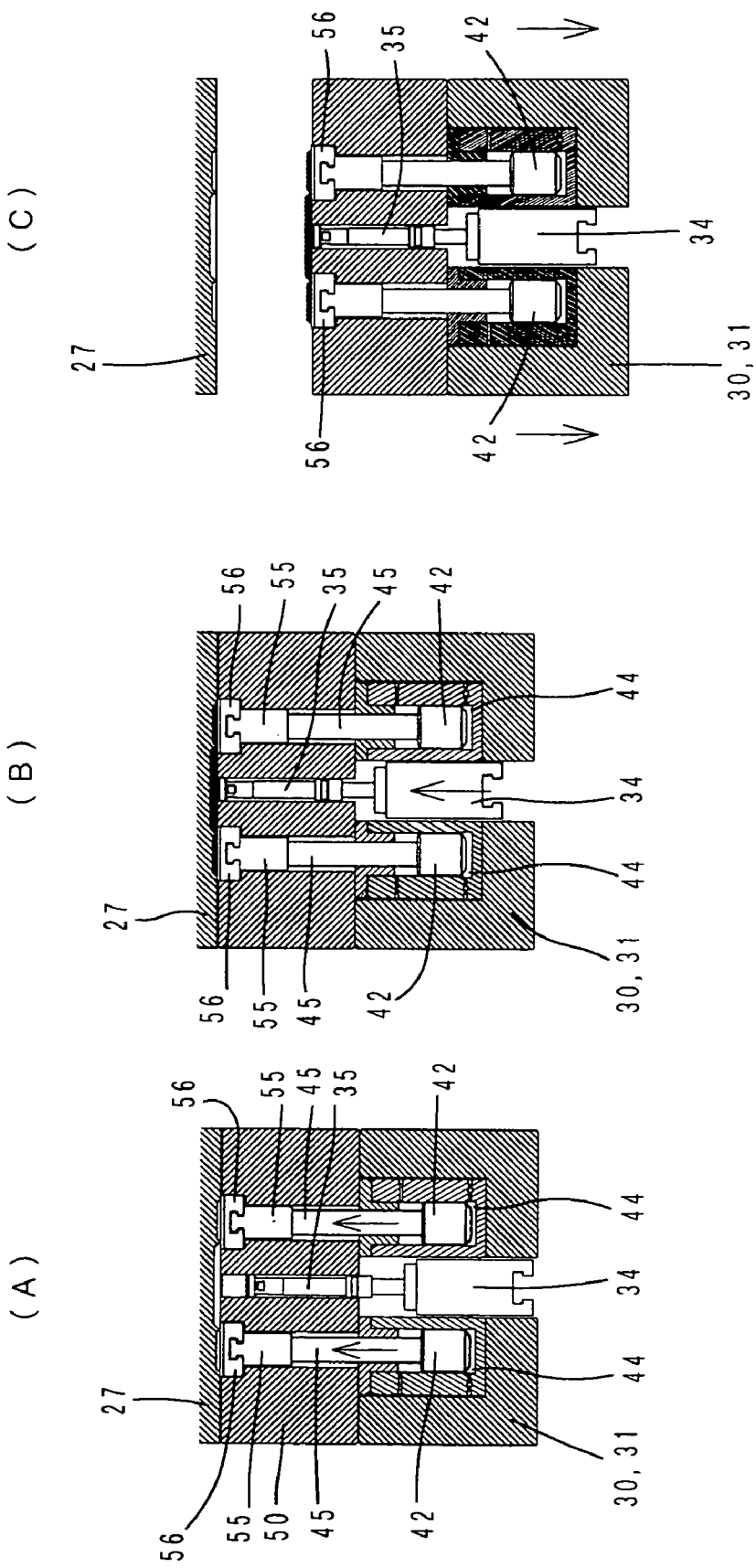
FIG. 7 is an operation diagram of the mold apparatus, continued from FIG. 6.

A guiding mechanism section 60 shown in FIGS. 4 and 5 is adjacent to the outward surface of said lower cavity bar 56. The guiding mechanism section 60 is constituted of an up-down movable block 61 and a guiding block 62, being adjacent with each other. Said up-down movable block 61 and said guiding block 62 are in contact with each other via respective tapered surfaces 61a, 62a. The up-down movable block 61 is suffering an upward pressure by a spring plunger 63. However, the up-down movable block 61 and the guiding block 62 can not be freely removed because it is coupled with a fixing pin 65 having a spring 64.

The encapsulation process of the mold apparatus for resin encapsulation having the above-mentioned component configuration is described below.

As shown in FIGS. 6(A) and 6(B), a plastic substrate board 70 is placed on the lower cavity bar 56, and a solid tablet 71 is inserted into the through hole 54a. The lower mold set 30 is pushed up by a driving mechanism not shown, whereby the lower mold set 30 is clamped to the upper mold set 10 (FIG. 6(C)).

As shown in FIGS. 4 and 5, when the lower mold set 30 rises, the lower surface of the upper holder base plate 21 contacts to the up-down movable block 61 and pushes it down. Accordingly, the up-down movable block 61 presses the guiding block 62 laterally via the tapered surfaces 61a, 62a, and the guiding block 62 is then positioned in a normal position for guiding the lower cavity bar 56. In this clamping state, the gap between the lower cavity bar 56 and the guiding block 62 keeps a spacing (0.001-0.015 mm) allowing the lower cavity bar 56 to slide. Thus, the up-down movement of the lower cavity bar 56 can be secured for compensating the variation of thickness of substrate boards.

Then, as shown in FIG. 7(A), the lower liquid chamber 44 is supplied with oil to push up the piston 42. The lower cavity bar 56 is lifted up via the rod 45 and the attach and detach block 55, or directly, whereby the substrate board 70 is clamped by the lower cavity bar 56 and the upper cavity bar 27. Further, the plunger 35 of the equi-pressure cylinder block 34 is lifted up, and the solid tablet 71 is fluidized by heating compression, and by injecting the resin, the substrate board 70 (FIG. 7(B)) is encapsulated and formed. Then, the lower mold apparatus 30 is lowered down to open the mold (FIG. 7(C)).

At this time, the load by the upper holder base plate 21 on the up-down movable block 61 is lost. Accordingly, the up-down movable block 61 is pushed up by the spring force of the spring plunger 63. Therefore, the pressing force on the guiding block 62 is released, and the guiding block 62 becomes movable sidewardly, then it evacuates from a predetermined position for positioning the lower cavity bar 56. As a result, even when the piston 42 rises considerably during the maintenance of the lower cavity bar 56, no sliding resistance occurs in that section because the guiding block 62 is evacuated from the predetermined position for positioning the lower cavity bar 56. Therefore, this has an advantage of non-occurrence of a scuffing or a sticking problem (locking) to the guiding block 62.

By lifting plunger 35 of the equi-pressure cylinder block 34 up higher than the position for resin encapsulation, and after lifting up the products from the lower cavity bar 56, the formed product is gripped by a carrier not shown, then the product is taken out.

A relief (not shown) may be provided in a part of the lower mold set 30 in order to pick up the product without lifting-up of the plunger of the equi-pressure cylinder block. Also, an ordinary ejector mechanism may be used for ejection.

The cleaning of the lower cavity bar 56 is carried out in the situation that the piston 42 is lifted up to the highest position and that the lower cavity bar 56 is then slid and extracted sidewardly. At this time, the extraction can be performed by removing apart of the components in the slide direction, depending on the extent of the cylinder stroke (highest lifted-up position).

Figure 9:
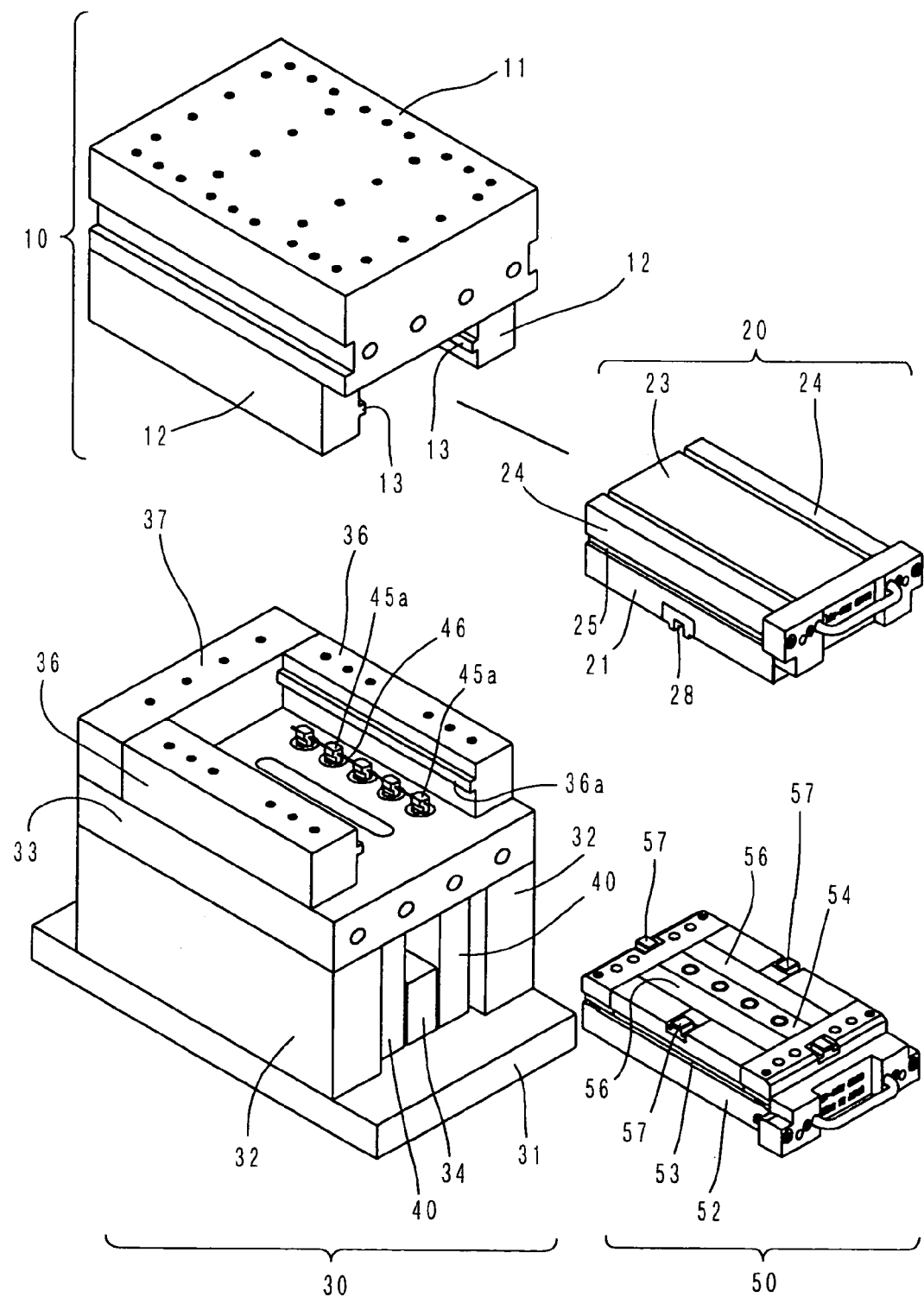
FIG. 9 is an exploded and perspective view showing a second embodiment of a mold apparatus for resin encapsulation in accordance with the present invention.
Figure 10:
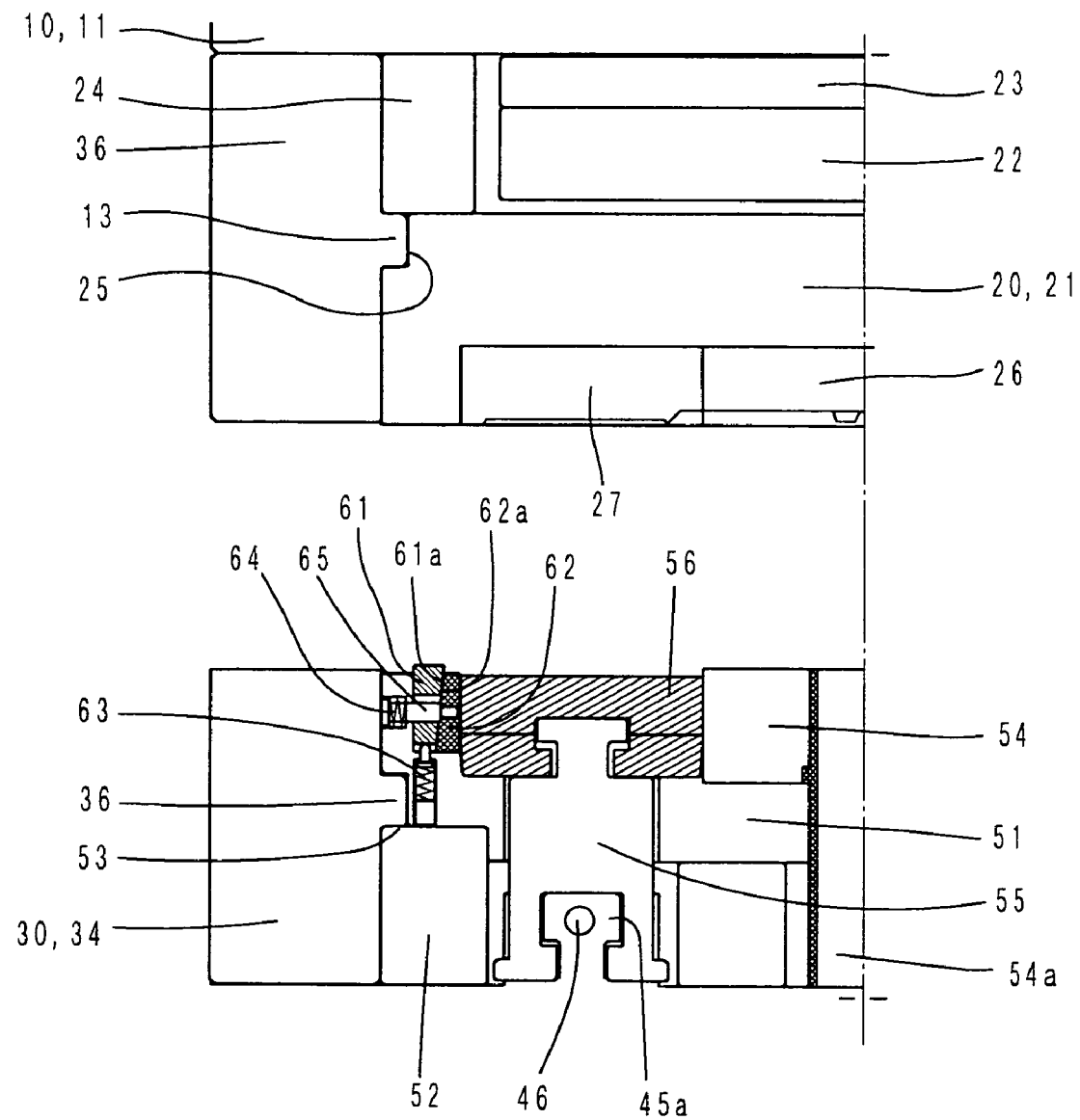
FIG. 10 is a fragmentary front crossectional view of the mold apparatus shown in FIG. 9 before operation.
Figure 11:
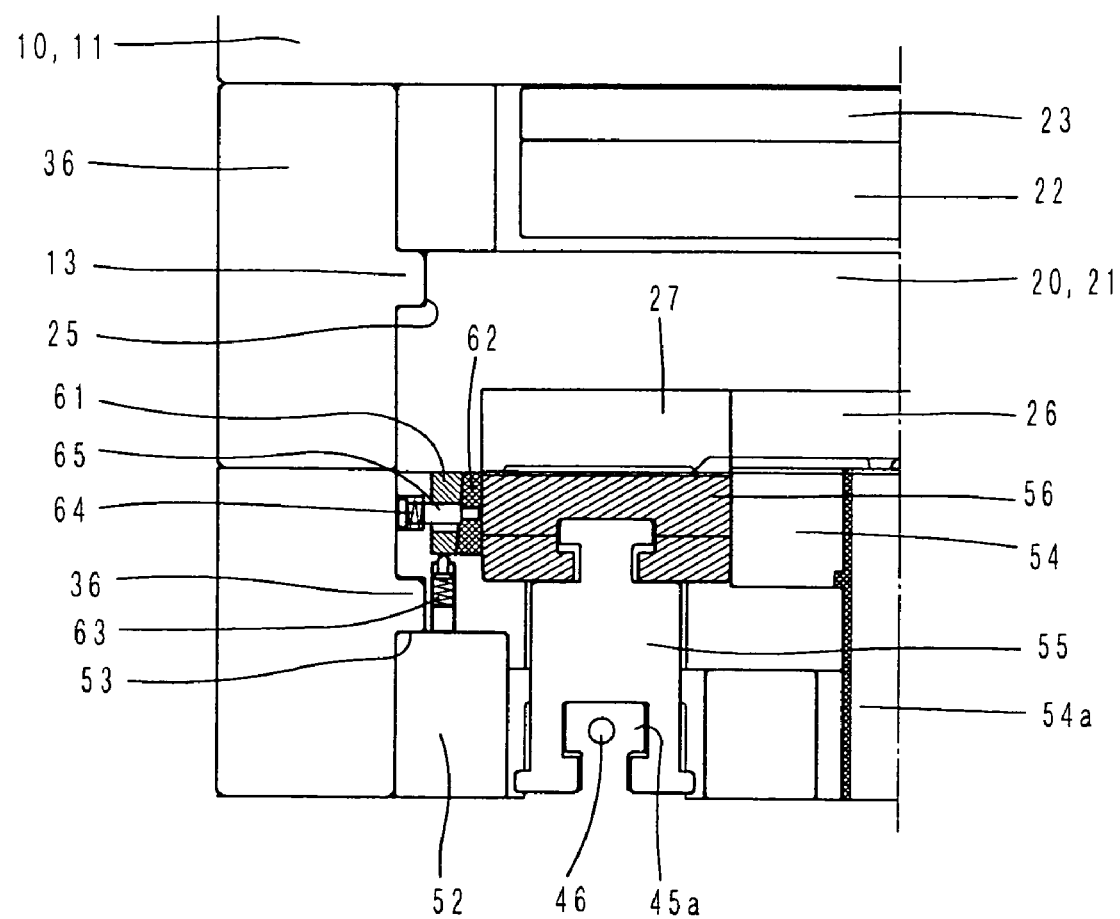
FIG. 11 is a fragmentary front crossectional view of the mold apparatus shown in FIG. 9 after operation.

A second embodiment is the same as the above-mentioned first embodiment except for the point that the upper end sections 45a of the rod 45 extending from the piston 42 are linked by a synchronization bar 46, as shown in FIGS. 9 to 11. The same section is designated with the same number, and the description is omitted.

In accordance with the second embodiment, since the pistons 42 are linked by a synchronization bar 46, no time lag occurs in the operation of each piston 42, and the response of the pistons 42 is much improved. Thus, the lower cavity bar 56 supported by the pistons 42 is pushed up simultaneously, and hence the lower cavity bar 56 neither slants nor deforms. Therefore, the slidability of the lower cavity bar 56 improves, so that no flash occurs, and whereby the yield rate advantageously improves.

Although a solid tablet is used as solid resin for encapsulation in the description of the above-mentioned embodiment, it is not a necessary restriction. Granular or powder solid resin may be used.

Further, the fluidification of said solid resin for encapsulation may be carried out by a simple compression alone instead of the heating compression.

The third embodiment in accordance with the present invention is described below with reference to the attached drawings of FIGS. 12 to 21.

Figure 12:
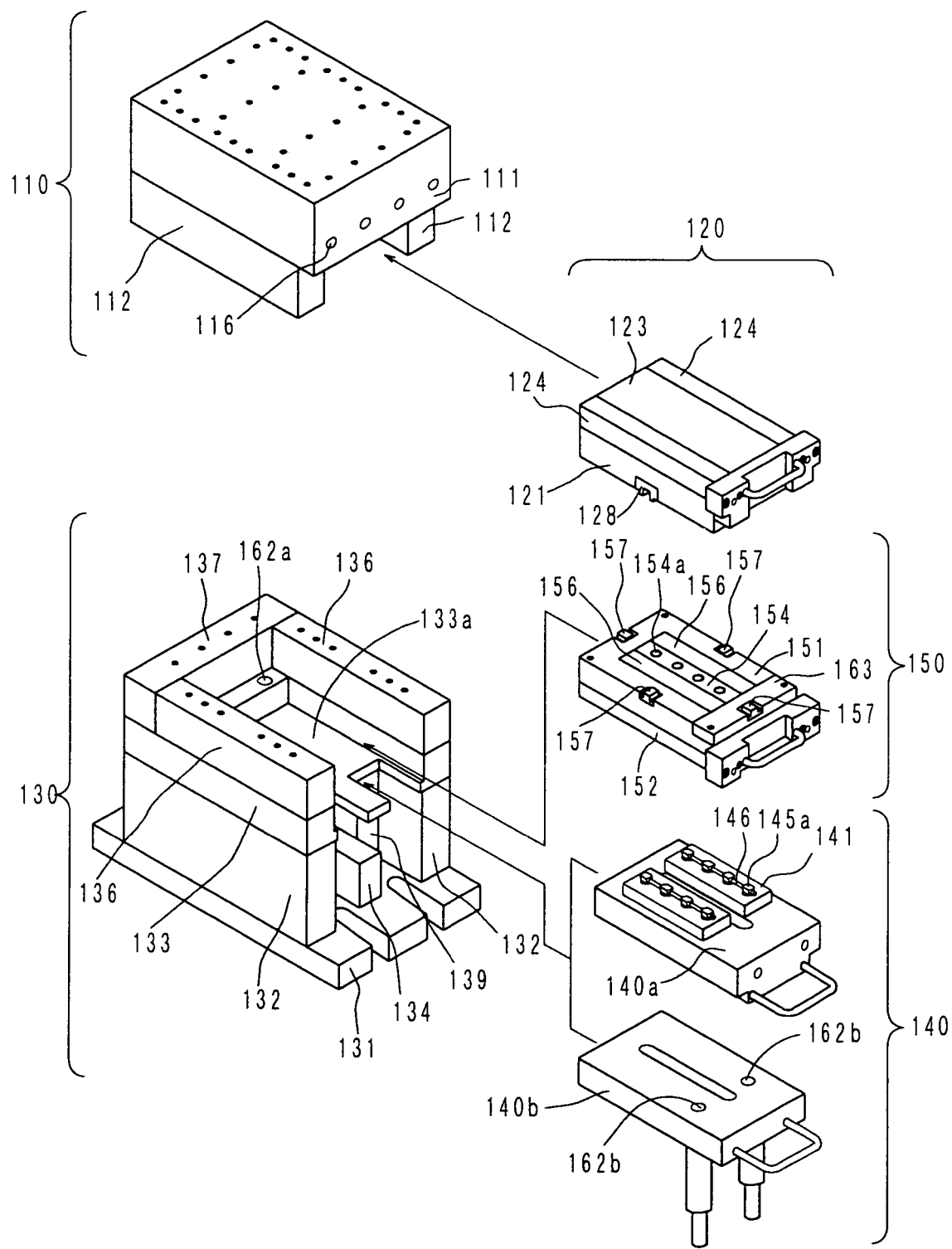
FIG. 12 is an exploded and perspective view showing a third embodiment of a mold apparatus for resin encapsulation in accordance with the present invention.

A mold apparatus for resin encapsulation in accordance with the third embodiment is generally constituted of an upper mold set 110 involving an upper chase 120 and a lower mold set 130 involving a lower chase 150 and a block 140, as shown in FIG. 12.

Figure 13:
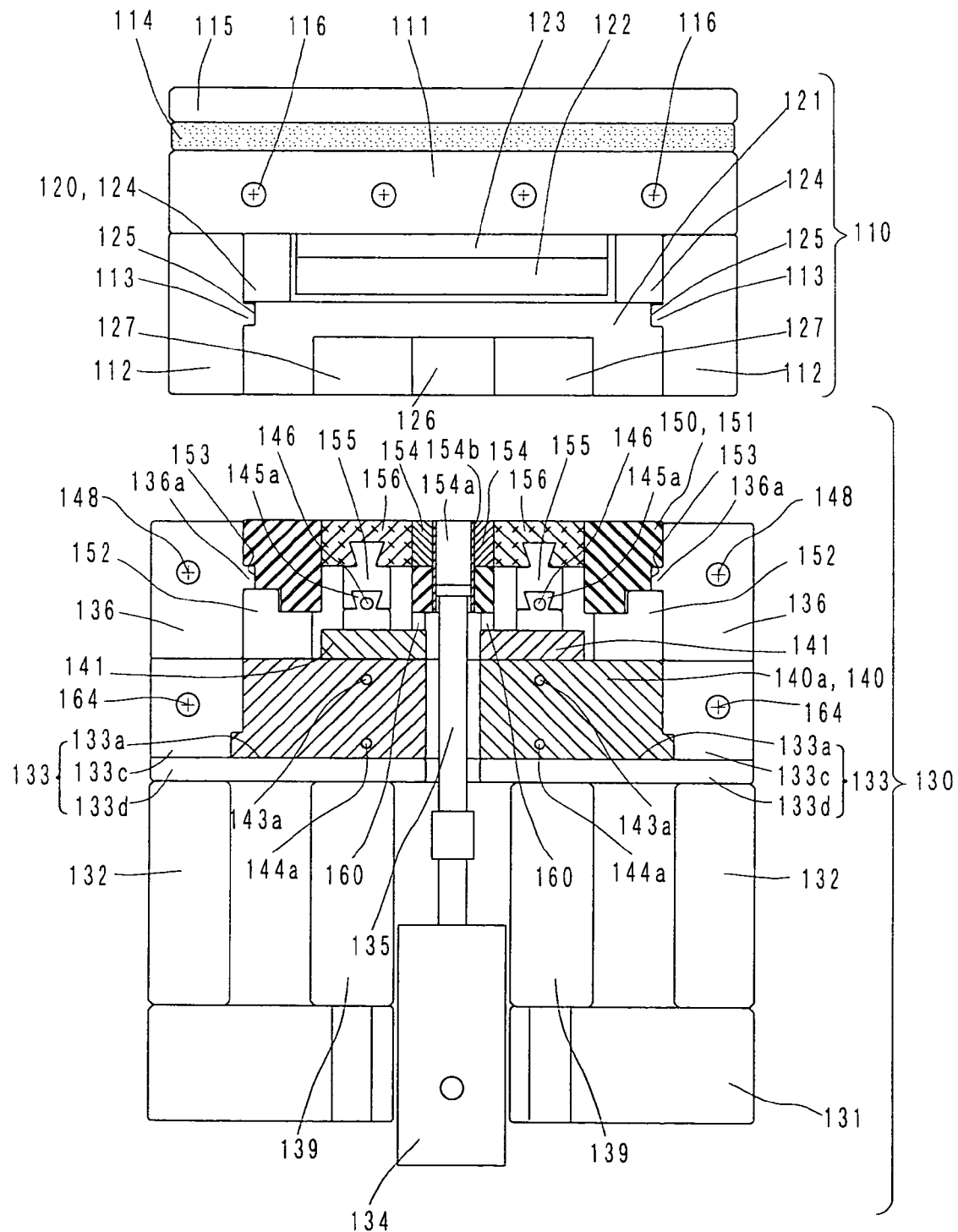
FIG. 13 is a front crossectional view of the mold apparatus shown in FIG. 12.

The upper mold set 110 is configured so that side blocks 112 are disposed in both edge side sections of the lower surface of an upper base plate 111, as shown in FIG. 12. Guiding rails 113, 113 are provided on the opposed inward surfaces of said side blocks 112, as shown in FIG. 13. The upper chase 120 described later can be slidably engaged thereto from the side direction.

A heat insulating plate 114 and a plate 115 are serially stacked on the upper surface of the upper base plate 111, as shown in FIG. 13. Further, a heater 116 for the mold heating is embedded in the upper base plate 111.

Said upper chase 120 is configured so that a pin plate 122 and an ejector plate 123 are serially stacked on the center of the upper surface of a holder base plate 121 and that space blocks 124 for chase are disposed on both side edge sections of the holder base plate 121 thereby to form engagement guiding grooves 125, as shown in FIGS. 12 and 13. On the other hand, upper cavity bars 127 constituting the upper molds are disposed on both sides of a cull block 126 disposed on the center of the lower surface of said holder base plate 121.

FIG. 12 shows an upper set block 128 for positioning the upper chase 120 relatively to a lower chase 150 described later.

Figure 14:
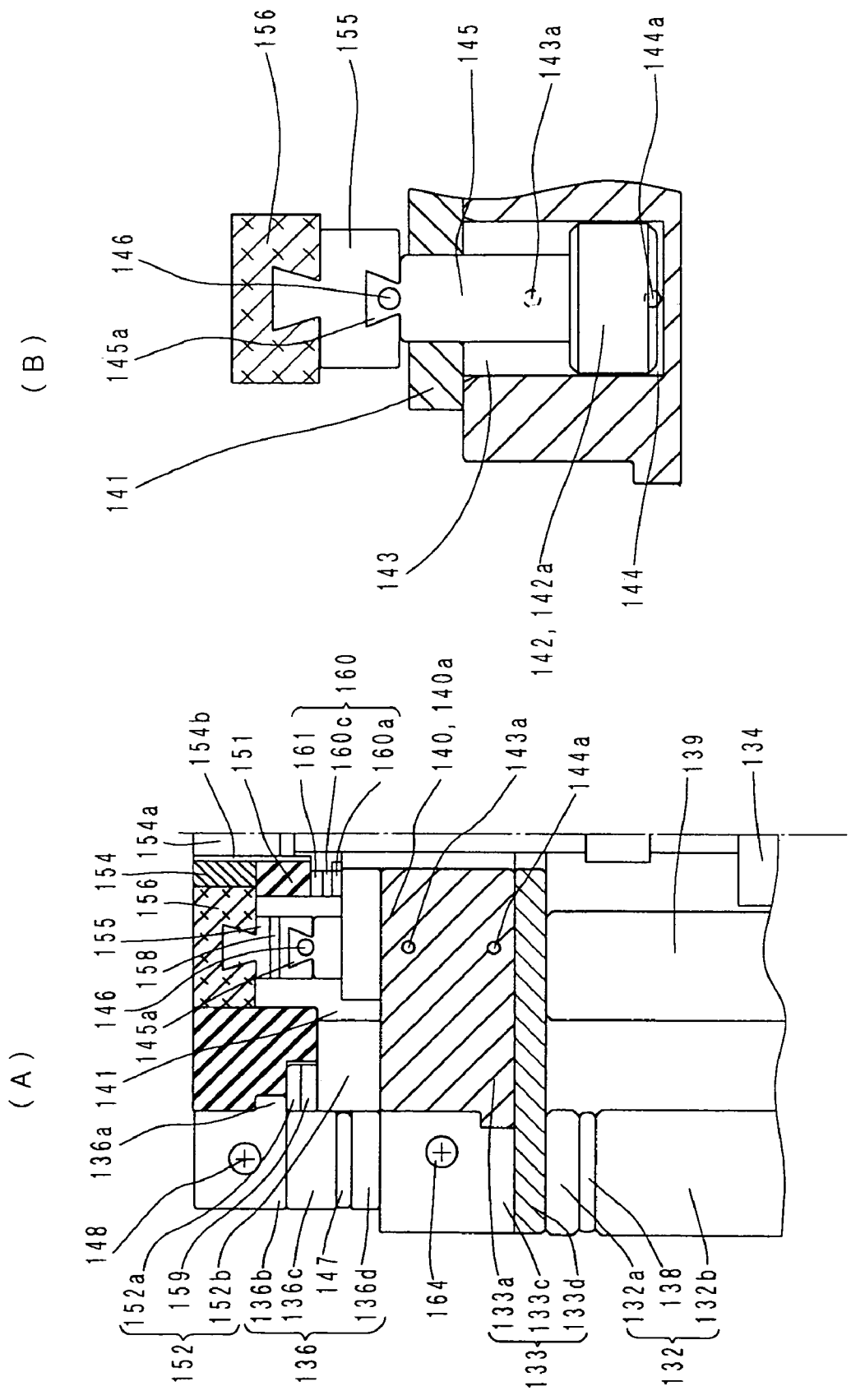
FIGS. 14(A) and 14(B) are a fragmentary front crossectional view and a enlarged crossectional view of the mold apparatus shown in FIG. 12.

The lower mold set 130 is configured so that a base plate 133 for lower chase is attached via space blocks 132 disposed in both edge side sections of the upper surface of a lower base plate 131, as shown in FIGS. 12 to 14. The space block 132 is formed by a heat insulating plate 138 and space block sections 132*a*, 132*b*.

An equi-pressure cylinder block 134 for plunger is disposed in the middle of said opposed space blocks 132, as shown in FIG. 13. In the equi-pressure cylinder block 134 for plunger, the plunger 135 is movable reciprocatingly in the axial direction through a through hole provided in a block 140. Further, support blocks 139 are disposed on both sides of the equi-pressure cylinder block 134 for plunger.

As shown in FIGS. 12 and 13, a base block 133*c* for lower chase in which a heater 164 is embedded and a plate 133*d* form a recess 133*a* on the center of the upper surface of said base plate 133 for lower chase. The recess 133*a* can be slidably engaged with a block 140 described later. The front surface of said block 140 is positioned in contact with the step section of the recess 133*a*. Further, said base plate 133 for lower chase carries side blocks 136 in both edge side sections thereof and carries an end block 137 in one end section of the upper surface thereof, as shown in FIG. 12.

Said end block 137 is formed by the stack of a heat insulating plate 147*b* and end blocks 137*a*, 137*b*, as shown in FIG. 15(B). On the other hand, said side block 136 is formed by a heat insulating plate 147 and side block sections 136*b*, 136*c*, 136*d*, as shown in FIG. 14(A). In said side blocks 136, 136 as shown in FIG. 13, guiding rails 136*a*, 136*a* for slidably engaging a lower chase 150 described later are formed on the opposed inward surfaces thereof, and heaters 148 are embedded therein.

A cylinder block 140*a*, which is one of the blocks 140, comprises a space sealed by a cylinder cover 141, as shown in FIG. 14(B). The space is separated into an upper liquid chamber 143 and a lower liquid chamber 144 by a skirt section 142*a* and a packing (not shown) of a piston 142. Said upper liquid chamber 143 and said lower liquid chamber 144 are connected through supplying and exhausting openings 143*a*, 144*a* in communication therewith respectively to an oil hydraulic pump (not shown). The upper end section 145*a* of a rod 145 extending in the coaxial direction from said piston 142 is extruding from a cylinder block 140*a* for piston provided in said base plate 133 for lower chase.

The upper end section 145*a* of said rod 145 is formed so as to slidably engage with an attach and detach block 155 linked to a heat insulating plate 158. The upper end section 145*a* of said rod 145 may be directly engaged with a lower cavity bar 156 without the attach and detach block 155. However, even in that case, it is preferable that a heat insulating plate 158 is attached to the linkage section.

The upper end sections 145*a* of said rods 145 are linked by a synchronization bar 146. Accordingly, no time lag occurs in the operation of each piston 142, and the response of the pistons 142 is much improved. Thus, the lower cavity bar 156 supported by the rods 145 extending in the coaxial direction from the pistons 142 is pushed up simultaneously, and hence the lower cavity bar 156 (lower mold) neither slants nor deforms. Therefore, the slidability of the lower cavity bar 156 improves, whereby no plastic flash occurs, and whereby the yield rate advantageously improves.

In said lower chase 150, as shown in FIGS. 12 to 14, space blocks 152 are disposed in both edge side sections of the lower surface of a lower holder base plate 151 thereby to form guiding grooves 153 (FIG. 13). Further, a center block 154 is disposed on the center of the upper surface of said lower holder base plate 151 (FIG. 14).

The space block 152 is formed by a heat insulating plate 159 and space block sections 152*a*, 152*b*, as shown in FIG. 14(A). Further, said center block 154 is provided with through holes 154*a* in a predetermined pitch, and pots 154*b* are set, as shown in FIG. 13. As such, solid tablets 171 described later inserted into said pots 154*b* are pushed out by said plungers 135.

Further, heaters 149 are provided between said pots 154*b* and on the both end sides, as shown in FIG. 16. Accordingly, the solid tablets 171 can be heated from the vicinity of the pots 154*b*, and melted efficiently.

In this case, the temperature of the lower chase 150 is adjusted by the heater 148 embedded in the side block 136*b* and the heaters 149 set between the pots 154*b*. However, the heater 164 embedded in the base block 133*c* for lower chase is not used.

A support block 160 for chase is provided for supporting the lower holder base plate 151 so as not to deform elastically. The support block 160 for chase is formed by a heat insulating plate 160*c*, a flanged support block 160*a* for chase, and a non-flanged support block 161 for chase, as shown in FIG. 14(A). The flange section of said flanged support block 160*a* for chase is used for forming a space extending to the pot 154*b*. Said space permits easy guiding and positioning of the heater wires of the heaters 149 provided between the pots 154*b*, which improves easiness in assembling.

An attach and detach block 155 is disposed on each side of said center block 154. The attach and detach block 155 is integrated with a heat insulating plate 158, and the lower end surface thereof is slidably engageable with the upper end section 145*a* of said rod 145.

Further, the upper end section 145*a* of the rod 145 can be slidably engaged directly with the lower cavity bar 156. Even in that case, it is preferable that a heat insulating plate 158 is attached to the linkage section.

As such, the heat insulating plates 147, 158, 159, 160*c* are provided in the surroundings of the cylinder block 140*a* for piston, whereby the temperature rise can be suppressed in the cylinder block 140*a* for piston. Further, the rise of cylinder oil temperature and the like can be suppressed, whereby a stable pressure can be supplied, and the temperature deterioration of the oil and the like can be avoided. For example, in case of the temperature of the cavity section is about 180° C., the temperature of the cylinder block 140*a* for piston is suppressed to about 120° C.

FIG. 12 shows a lower set block 157 for positioning the lower chase 150 relatively to the upper chase 120.

The encapsulation process of the mold apparatus for resin encapsulation is described below for the case that the cylinder block 140*a* is involved as a block 140. The present embodiment is an encapsulation process without using the attach and detach block 155.

As shown in FIGS. 19(A) and 19(B), a plastic substrate board 170 is placed on the lower cavity bar 156, and a solid tablet 171 is inserted into the pot 154*b*. The lower mold set 130 is pushed up by a driving mechanism not shown, whereby the lower mold set 130 is clamped to the upper mold set 110 (FIG. 19(C)).

Then, as shown in FIG. 20(A), the lower liquid chamber 144 is supplied with oil to push up the piston 142. The lower cavity bar 156 is lifted up by the rod 145, whereby the plastic substrate board 170 is clamped by the lower cavity bar 156 and the upper cavity bar 127. Further, the plunger 135 of the equi-pressure cylinder block 134 is lifted up, and the solid tablet 171 is fluidified by heating compression, and by injecting the resin, the substrate board 170 (FIG. 20(B)) is encapsulated and formed. Then, the lower mold apparatus 130 is lowered down to open the mold (FIG. 20(C)).

By lifting the plunger 135 of the equi-pressure cylinder block 134 up higher than the position for resin encapsulation, and after lifting up the formed product from the lower cavity bar 156 (FIG. 21(A)), the formed product is gripped by a carrier not shown, then the formed product is taken out.

A relief (not shown) may be provided in a part of the lower mold set 130 in order to pick up the formed article via said relief without lifting-up of the plunger 135 of the equi-pressure cylinder block 134.

The cleaning of the lower cavity bar 156 is carried out in the situation that the piston 142 is lifted up to the highest position and that the lower cavity bar 156 is then slid and extracted sidewardly from the rod 145, as shown in FIG. 21(B). At this time, the extraction can be performed after removing a removal block 163 (FIG. 12) locking in the slide direction, depending on the extent of the cylinder stroke (highest lifted-up position).

Although a solid tablet is used as solid resin for encapsulation in the description of the above-mentioned embodiment, it is not a necessary restriction. Granular or powder solid resin may be used. Further, the fluidification of said solid resin for encapsulation may be carried out by a simple compression alone instead of the heating compression.

A mold apparatus for resin encapsulation in accordance with the present invention can encapsulate a metallic substrate board, as required.

Figure 17:
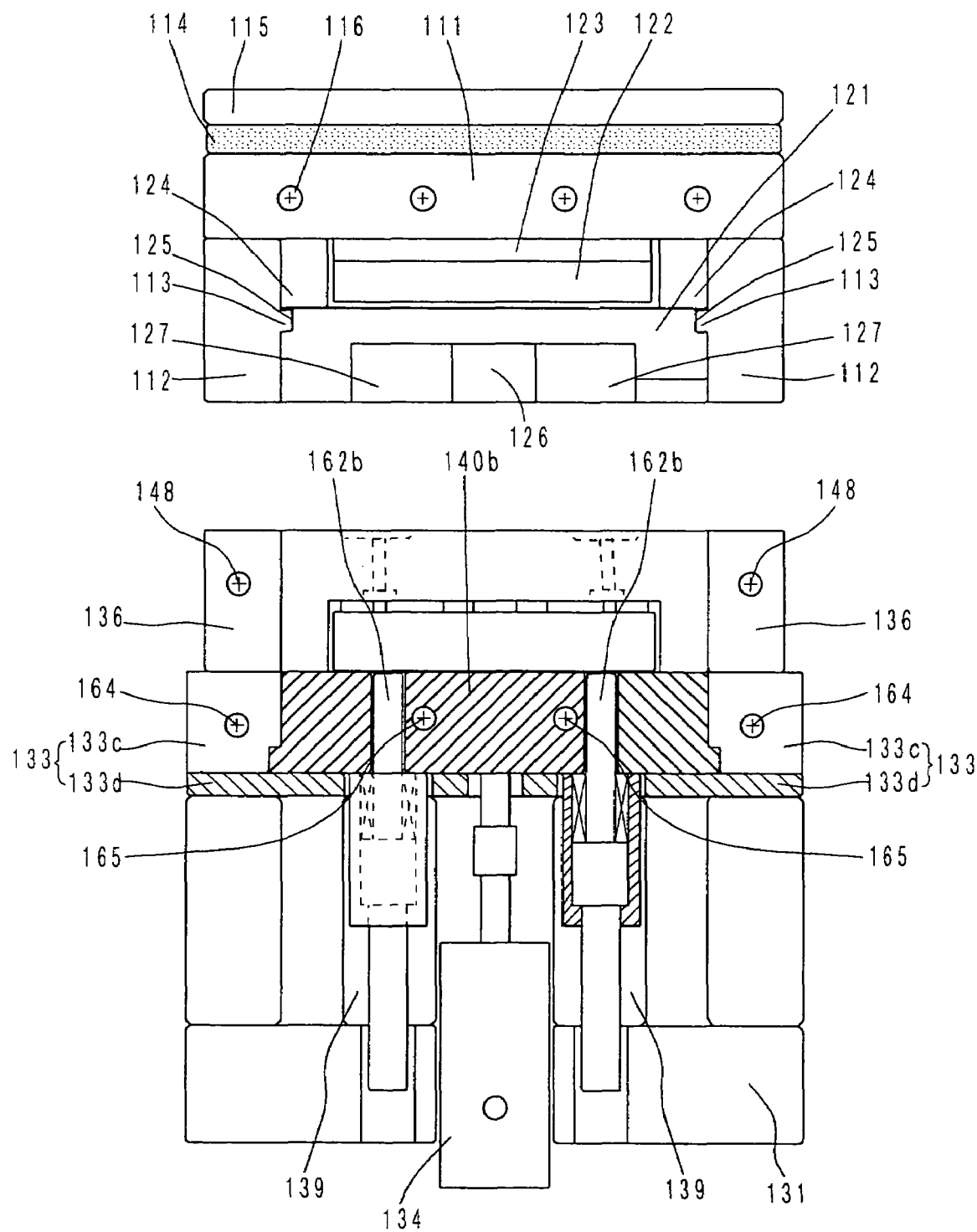
FIG. 17 is a front crossectional view showing another form of usage of a mold apparatus for resin encapsulation in accordance with the present invention.
Figure 19:
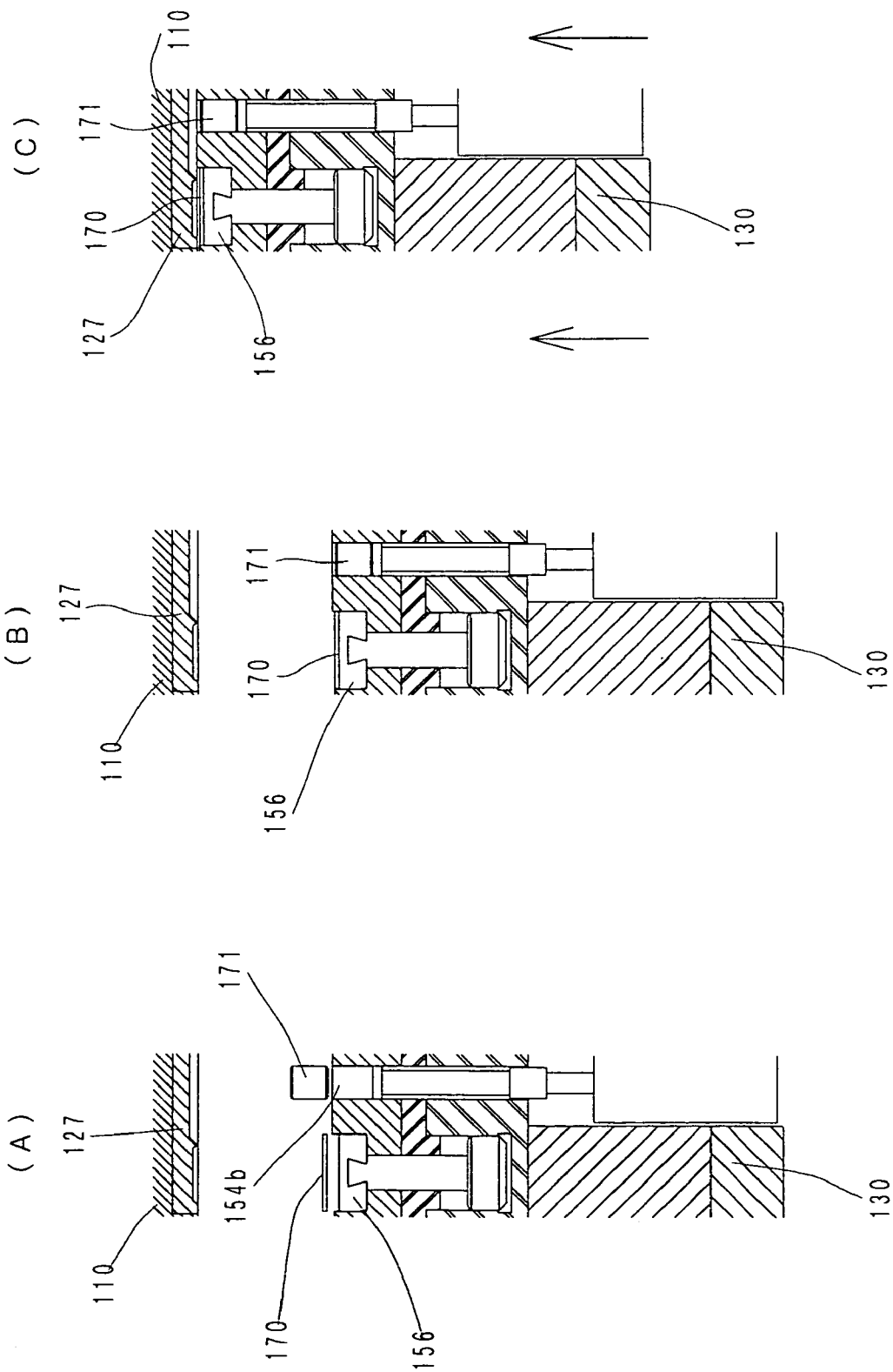
FIG. 19 is an operation diagram of the mold apparatus shown in FIG. 12.
Figure 20:
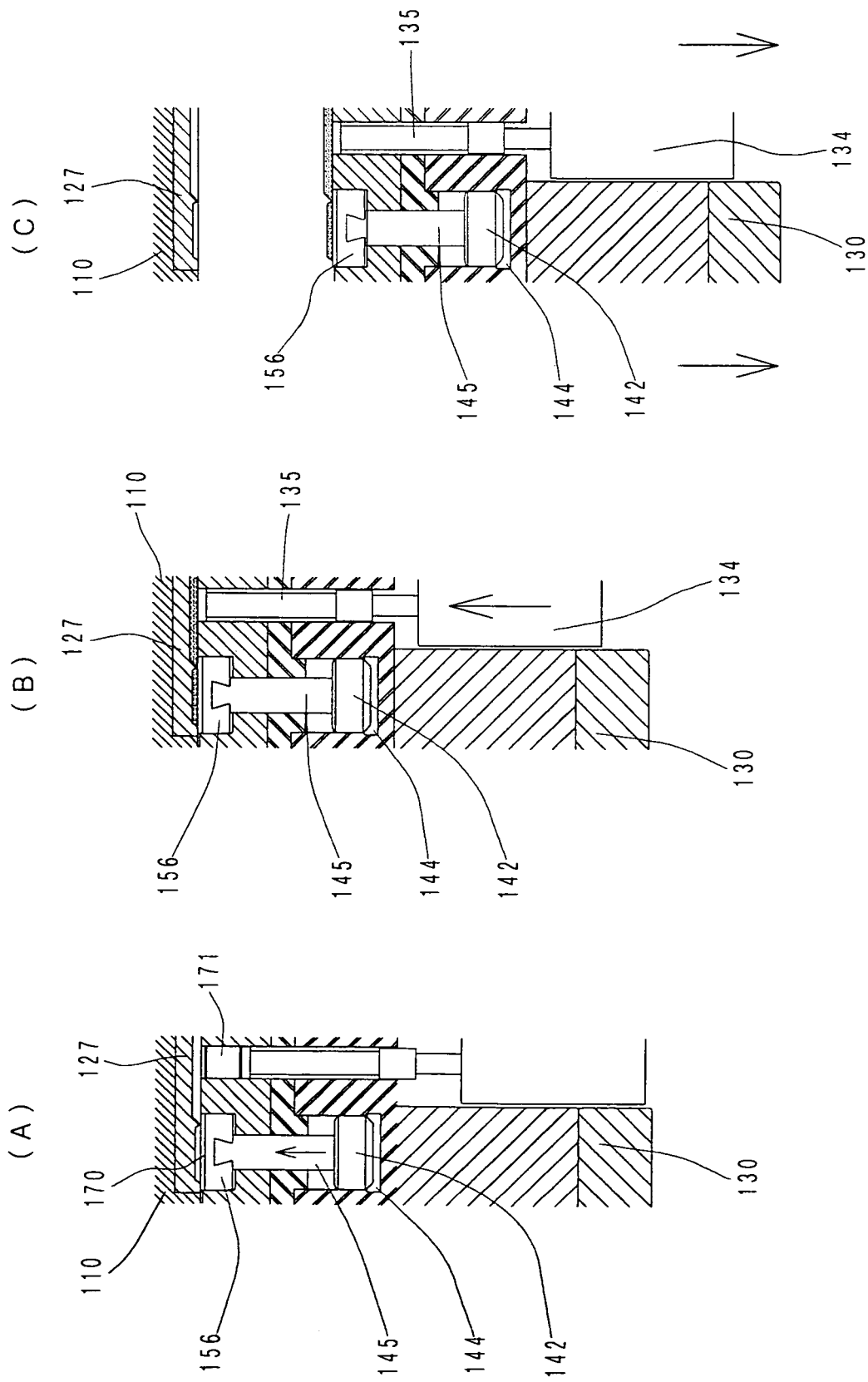
FIG. 20 is an operation diagram of the mold apparatus, continued from FIG. 19.
Figure 21:
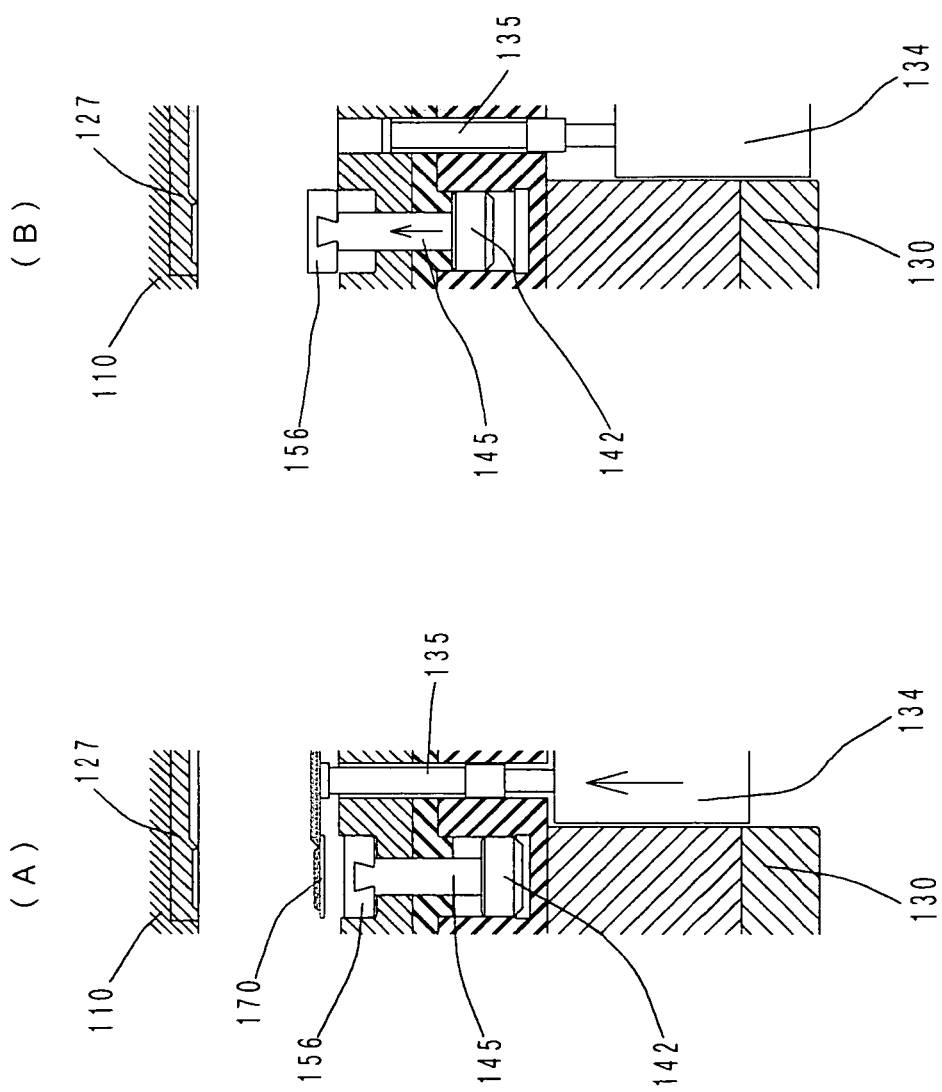
FIG. 21 is an operation diagram of the mold apparatus, continued from FIG. 20.

That is, in case of encapsulation of a metallic substrate board, the cylinder block 140a is changed to a normal base block 140b having ejector rods as shown in FIG. 12, and the upper and the lower chases 120, 150 are changed to an upper and a lower chases for metallic substrate boards, which are not shown. In said normal base block 140b having ejector rods, two ejector rods 162b are disposed adjacently to a handle for insertion and extraction (FIG. 17,18).

On the other hand, two ejector rods 162a are previously involved in a step section adjacent to the end block 137 of the lower mold set 130 (FIGS. 12 and 18). Accordingly, the two ejector rods 162a and the two ejector rods 162b push up said lower chase for metallic substrate boards.

Figure 29:
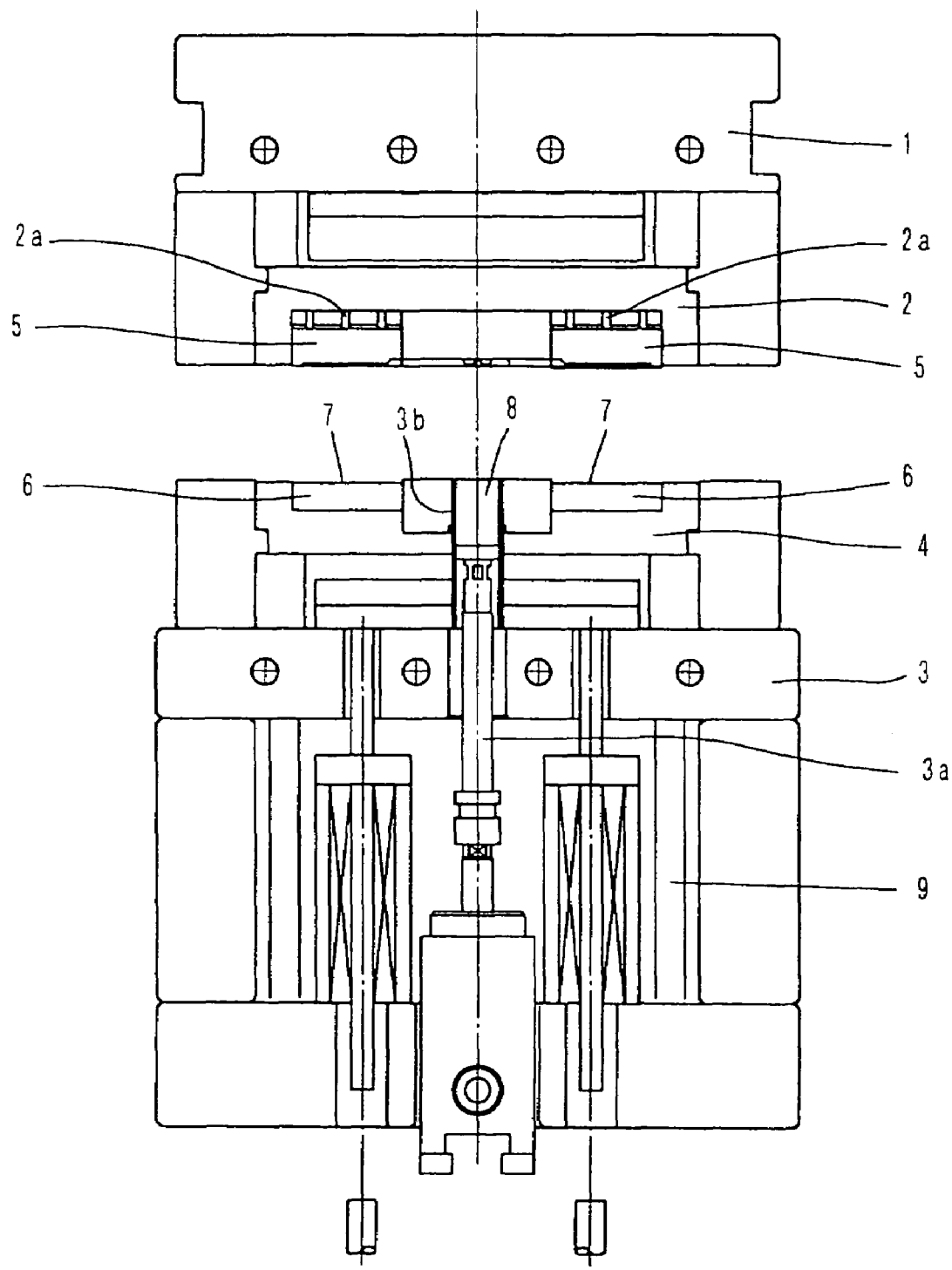
FIG. 29 is a front crossectional view of a mold in accordance with the prior art.

A support block 139 for preventing the elastic deformation of the base block 133 for lower chase is fixed to the lower mold set 130. Thus, when the normal base block 140b having ejector rods is involved in place of the cylinder block 140a for piston, into the lower mold set 130, all the elements of a conventional lower mold set for metallic substrate boards are completed. As a result, the situation becomes substantially identical to the prior art example shown in FIG. 29, and hence metallic substrate boards can be encapsulated with resin using a conventional lower chase for metallic substrate boards.

The encapsulation process of a metallic substrate board is almost the same as the encapsulation process of a plastic substrate board, and hence the description is omitted. Here, the temperature of the lower chase for metallic substrate boards is adjusted by a heater 164 of the base block 133c for lower chase and a heater 165 of the normal base block 140b having ejector rods. A heater 148 of the side block 136b is not used.

A mold apparatus for resin encapsulation in accordance with the present invention is not only capable of performing the resin encapsulation of one side of a plastic substrate board and a metallic substrate board but also capable of performing the resin encapsulation of both sides thereof when the upper and the lower cavity bar are changed properly.

Further, said normal base block may be used for the encapsulation of a plastic film and the like as well as the encapsulation of a metallic substrate board.

The normal base block 140b is unnecessary to be one piece, and may be separable into some small blocks, for example, into a small block involving the ejector rod and other small blocks.

A fourth embodiment in accordance with the present invention is described below with reference to the attached drawings of FIGS. 22 to 28.

Figure 22:
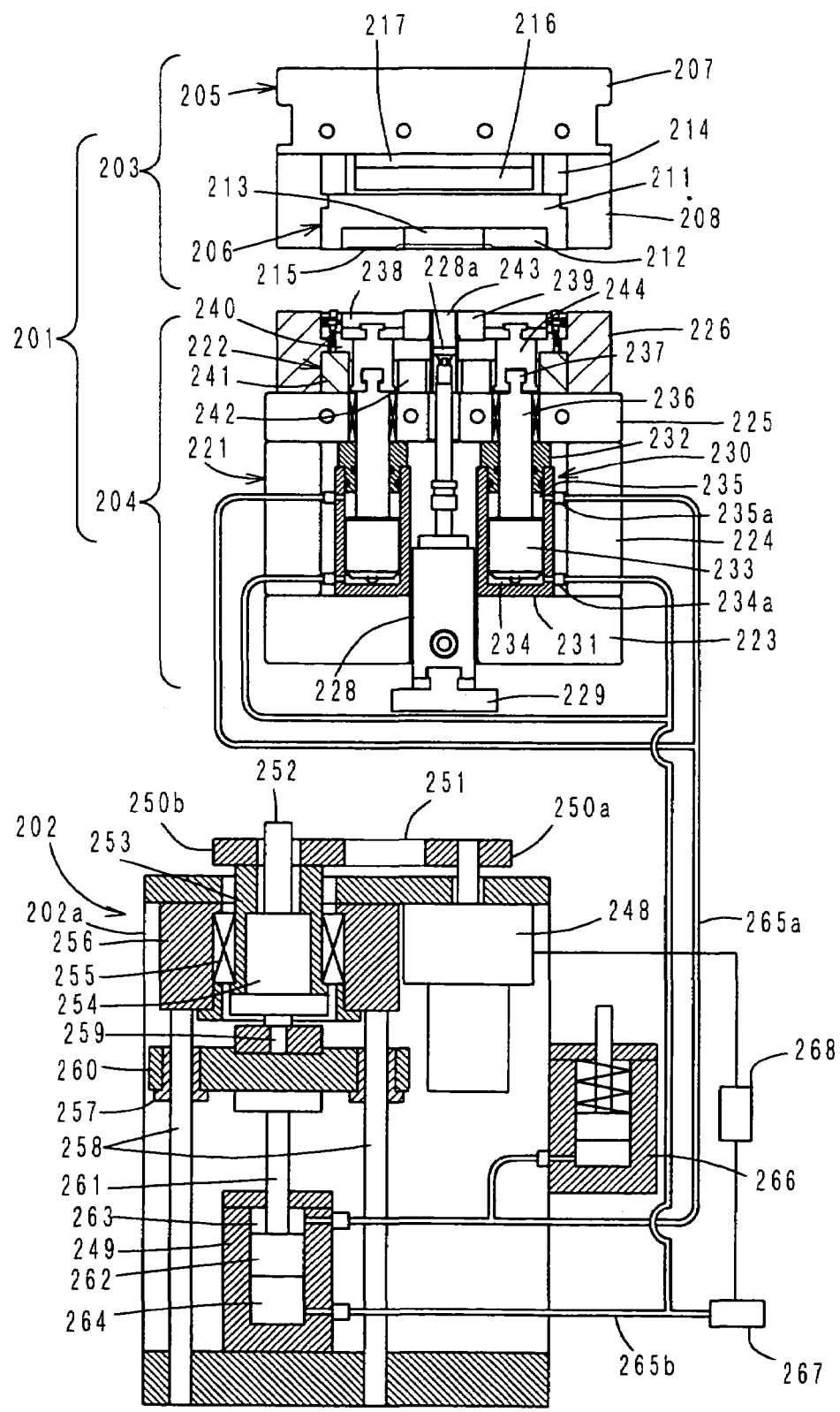
FIG. 22 is a front crossectional view showing a fourth embodiment of a mold apparatus for resin encapsulation in accordance with the present invention.

FIG. 22 shows a multi-plunger type mold apparatus for resin encapsulation in accordance with the fourth embodiment. The mold apparatus for resin encapsulation is generally constituted of a mold apparatus 201 and an oil pressure adjusting apparatus 202.

Figure 23:
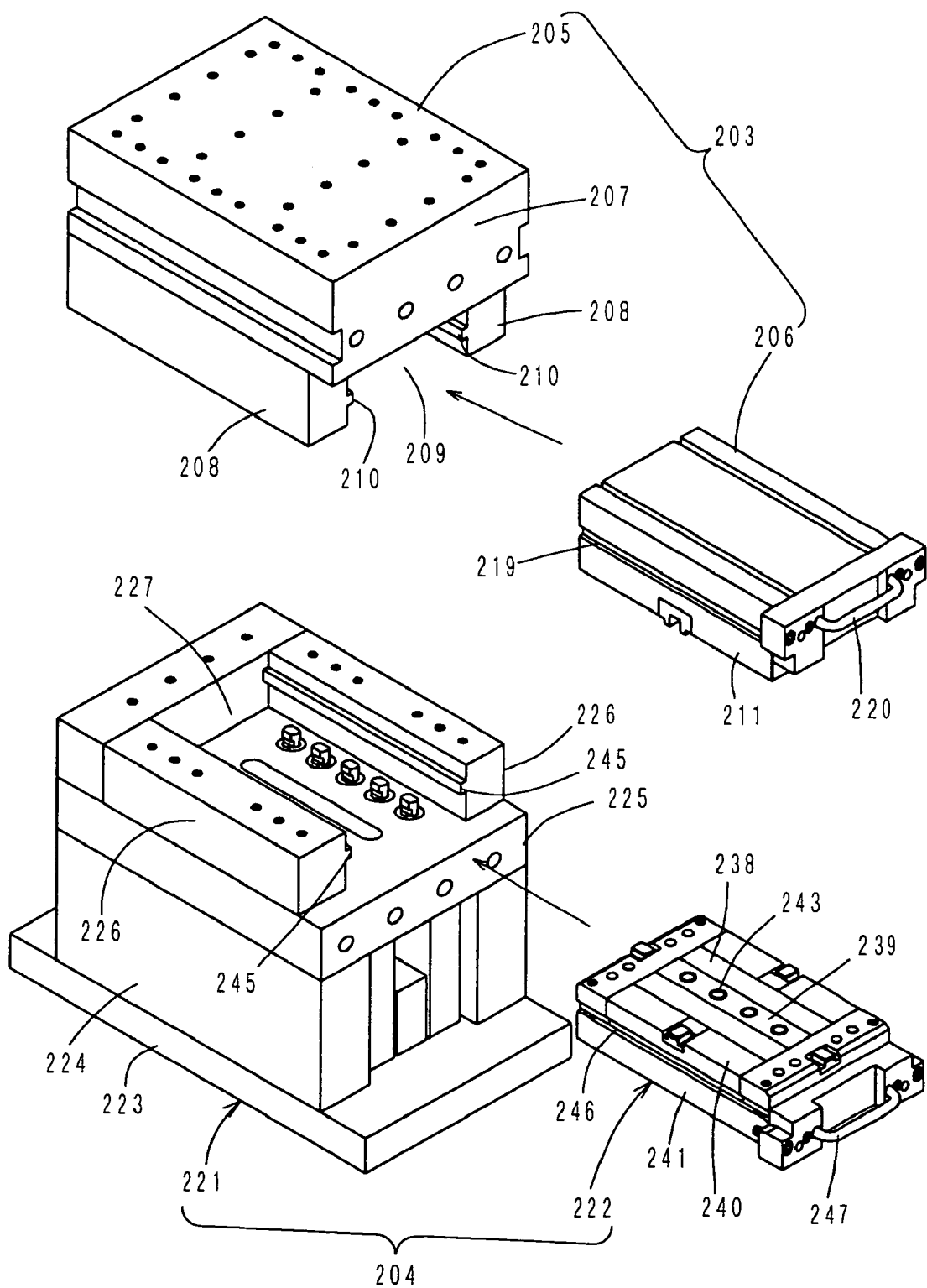
FIG. 23 is a general perspective view of the mold apparatus for resin encapsulation shown in FIG. 22, when a chase is inserted.
Figure 24:
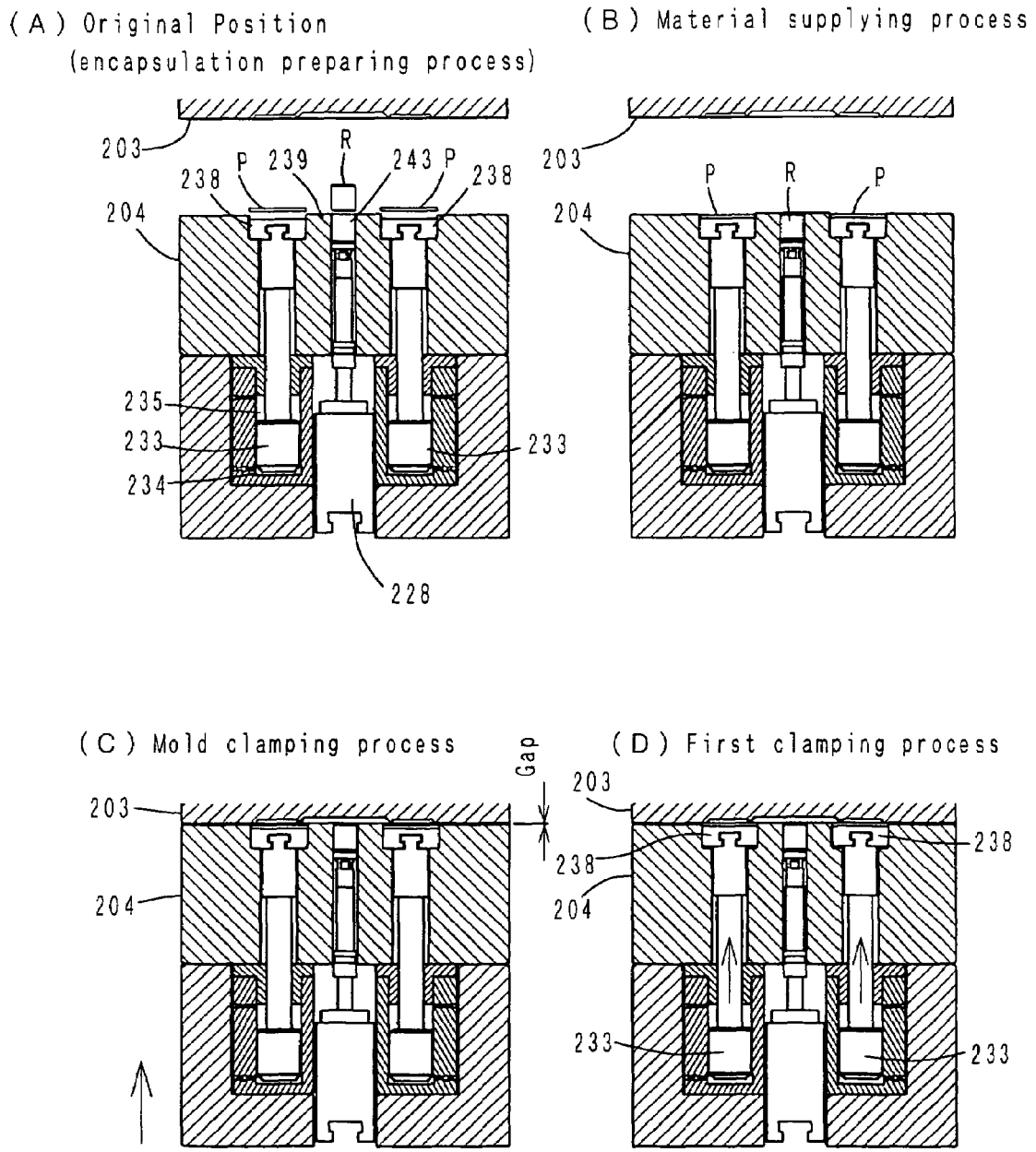
FIG. 24 are process diagrams showing a method of resin encapsulation in accordance with the present embodiment.

The mold apparatus 201 is composed of a fixed side mold 203 and a movable side mold 204 as shown in FIG. 23. In the fixed side mold 203, a fixed side chase 206 is provided detachably in a fixed side mold set 205. In the fixed side mold set 205, a fixed side base plate 207 and a pair of side blocks 208 form a fixed side space 209. The fixed side space 209 opens downwardly and to one side. On the opposed surfaces of the side blocks 208, guiding rails 210 extending to the side opening are formed.

In the fixed side chase 206, a cavity bar 212, a cull block 213, and a space block 214 for chase are assembled to a holder base plate 211. In the cavity bar 212, a fixed side cavity 215 is formed. The fixed side chase 206 is further provided with a pin plate 216, an ejector plate 217, and a support pin (not shown). In the side surfaces of the fixed side chase 206, guiding grooves 219 are formed for engaging with the guiding rails 210 of said side blocks 208, and a handle 220 is provided in the end surface. Using the handle 220, an operator can easily attach and detach the fixed side chase 206 by sliding it to the fixed side space 209.

In the movable side mold 204, a movable side chase 222 is provided detachably in a movable side mold set 221. In the movable side mold set 221, a space block 224 and a base plate 225 for movable side chase are serially provided on a movable side base plate 223, and side blocks 226 are provided on the base plate 225 for movable side chase. The base plate 225 for movable side chase and the side blocks 226 form a movable side space 227 opening upwardly and to one side.

As shown in FIG. 22, an equi-pressure cylinder block 228 is provided on the center of said movable side base plate 223. The equi-pressure cylinder block 228 is linked at the rear end by a transfer plate 229, and driven back and forth by a driving mechanism not shown.

Pressurizing cylinders 230 are provided on both sides of the equi-pressure cylinder block 228 between said space blocks 224. In each pressurizing cylinder 230, a piston 233 is provided in a liquid chamber 234, 235 formed by a cylinder block 231 and a cylinder cover 232, and driven independently. In a lower liquid chamber 234 which is a liquid chamber for extrusion and separated by the piston 233, a pressure receiving opening 234a is formed. In an upper liquid chamber 235 which is a liquid chamber for retraction, a back pressure opening 235a is formed. Oil from the oil pressure adjusting apparatus 202 described later is supplied or exhausted through those openings. A rod 236 extending from the piston 233 passes through the cylinder cover 232 and the base plate 225 for movable side chase, and is exposed in the upper surface of the base plate 225 for movable side chase. The exposed tip section of the rod 236 is an engaging section 237 generally having a box shape. Here, said pressurizing cylinders 230 may be built in the base plate 225 for movable side chase.

A movable side chase 222 is an integration of a cavity bar 238, a center block 239, a holder base plate 240, a space block 241 for chase, and a support pin 242. The cavity bar 238 is linked via an attach and detach block 244 to the engaging section 237 of the tip of said rod 236. The center block 239 is provided with a through hole within which a plunger chip 228a linked to the tip section of said equi-pressure cylinder block 228 slides, whereby a pot section 243 is constituted. The pot section 243 is supplied with resin to fill into the cavity. Similarly to said fixed side mold set 205, the opposed surfaces of the side blocks 226 are provided with guiding rails 245, and the side surfaces of the movable side chase 222 are provided with guiding grooves 246 for engaging with the guiding rails 245 and a handle 247.

The oil pressure adjusting apparatus 202 actuates an electrical liquid pressure generating cylinder 249 with a servo motor 248, thereby to drive the pressurizing cylinder 230 provided in said movable side mold 204.

It is noted that a rotary pump or reciprocating pump with a motor may be used instead of the electrical liquid pressure generating cylinder 249 with a servo motor 248. The rotary pump includes a gear pump, a vane pump, a screw pump. The reciprocating pump includes a radial piston pump, an axial piston pump, a reciprocating piston pump.

The servo motor 248 transfers a driving force through a timing belt 251 over pulleys 250a, 250b to a ball screw 252. The ball screw 252 is engaged with a nut section 254 retained by a bracket 253. The bracket 253 is supported rotatably through a bearing 255 by a block 256. The block 256 is fixed to a main body bracket 202a. The lower end section of said nut section 254 is linked through a shaft 259 to a movable plate 260. The movable plate 260 is slidable up and down along four guiding shafts 258 passing therethrough via bushings 257. The center of the lower surface of the movable plate 260 is linked to the piston rod 261 of the liquid pressure generating cylinder 249. In the liquid pressure generating cylinder 249, an upper liquid chamber 263 and a lower liquid chamber 264 are formed by a piston 262 disposed in the cylinder. The upper liquid chamber 263 is connected through a first hose 265a to a back pressure opening 235a, and in communication with the upper liquid chamber 235 of said pressurizing cylinder 230. The lower liquid chamber 264 is connected through a second hose 265b to a pressure receiving opening 234a, and in communication with the lower liquid chamber 234 of said pressurizing cylinder 230. A single-action cylinder 266 is provided in the middle of the first hose 265a. The single-action cylinder 266 serves as a buffer during the clamping of a substrate board. A pressure sensor 267 is provided in the middle of the second hose 265b. The liquid pressure detected by the pressure sensor 267 is input to a controlling apparatus 268. The controlling apparatus 268 controls and drives said servo motor 248 depending on the detected liquid pressure. Here, said pressure sensor 267 detects a reduced pressure state, thereby permitting the position control of the equi-pressure cylinder block 228.

The operation of said mold apparatus for resin encapsulation is described below.

In the initial state (original position) shown in FIG. 24(A), the movable side mold 204 is lowered down by a driving mechanism not shown, and is apart from the fixed side mold 203 (encapsulate preparing process). At that time, the equi-pressure cylinder block 228 moves down, and the pot section 243 is formed in the center block 239. Further, the servo motor 248 shown in FIG. 22 drives the piston 262 to move up, and the pressure of both the upper liquid chamber 263 of the liquid pressure generating cylinder 249 and the upper liquid chamber 235 of pressurizing cylinder 230 increases. As a result, the piston 233 moves down, and the cavity bar 238 retracts to a position not to contact to the cavity bar 212 of the fixed side mold 203 even when the mold is closed. Then, as shown in FIG. 24(B), a substrate board P is automatically supplied into the movable side mold 204 and positioned by a transferring apparatus not shown, and forming resin R is supplied into said pot section 243 (material supplying process).

Then, the movable side mold 204 is lifted up thereby to close the mold as shown in FIG. 24(C) (mold clamping process). Further, as shown in FIG. 24(D), the lower liquid chamber 234 of the pressurizing cylinder 230 is supplied with oil, whereby the piston 233 is lifted up, and the substrate board P is clamped by the cavity bar 238 (first clamping process). The clamping force used here is 70-80% of the ordinary force. This suppresses the amount of deformation of the plastic substrate board P supplied automatically, thereby preventing the elongation and the breakage of a wire extending from an electronic component mounted on the surface.

After that, as shown in FIG. 25(A), the equi-pressure cylinder block 228 is lifted up, whereby the resin R supplied in the pot section 243 is melted to fill into the cavity (first resin filling process). The equi-pressure cylinder block 228 is moved with a large initial amount of the movement and with subsequent deceleration to a constant speed, for example, as shown in FIG. 27(A). The amount of the resin filled here is set to be 80-90% of the complete filling, which is an extent that electronic components and wires mounted on the substrate board P are almost covered. By the covering of the electronic components and the wires, the influence of the deformation in the next second clamping process is alleviated, and the leak of the resin is avoided even with a weak clamping force.

After that, as shown in FIG. 25(B), the lower liquid chamber 234 of the pressurizing cylinder 230 is supplied with more oil, whereby the force of clamping the substrate board P by the cavity bar 238 is increased to 100% (second clamping process). In that case, electronic components and wires mounted on the substrate board P are (completely or partially) covered with resin. Therefore, a small deformation of the substrate board P due to the increased clamping force does not cause an adverse influence, such as the deformation of electronic components and wires.

After that, as shown in FIG. 25(C), the equi-pressure cylinder block 228 is further lifted up, whereby the filling of resin into the cavity is completed (second resin filling process). Since the clamping force has been increased to 100% in said second clamping process, the resin does not leak from the contacting faces of the molds. Thus, no flash occurs.

Finally, as shown in FIG. 25(D), the movable side mold 204 is lowered down to open the mold (mold opening process). The equi-pressure cylinder block 228 is lifted up above the resin encapsulation position as shown in FIG. 26(A). The product is picked up from the mold. The product is gripped by a carrier not shown, and is ejected from the mold (product ejecting process). A relief for the claw section of the carrier may be provided in the mold in order to pick up the product using the carrier alone without lifting-up of the equi-pressure cylinder block 228.

As such, in said method of resin encapsulation, a plastic substrate board is clamped with deformation being suppressed in the first clamping process, and resin is then filled to an extent that an electronic component and a wire extending therefrom are almost covered. Therefore, a trouble, such as the elongation and the breakage of a wire, does not occur even when the clamping force is increased in the second clamping step.

In case of the maintenance of said multi-plunger type mold apparatus for resin encapsulation, as shown in FIG. 26(B), the piston 233 is lifted up to the upper dead point, thereby pushing out and removing the cavity bar 238. Then, the maintenance of the cavity bar 238 is carried out. In the present mold apparatus, the fixed side chase 206 and the movable side chase 222 can be extracted and inserted. In case of item change, a mold item can be changed only by changing said chases 206, 222 and the equi-pressure cylinder block 228. Thus, the work efficiency in the maintenance is very high. There is a case that the change of the cavity bar 238 alone instead of said chase 222 is enough, depending on the item.

Although the pressurizing cylinder 230 is supplied with oil by a single oil pressure adjusting apparatus 202 in said embodiment, oil pressure adjusting apparatuses may be provided in respective pressurizing cylinders 230.

Figure 28:
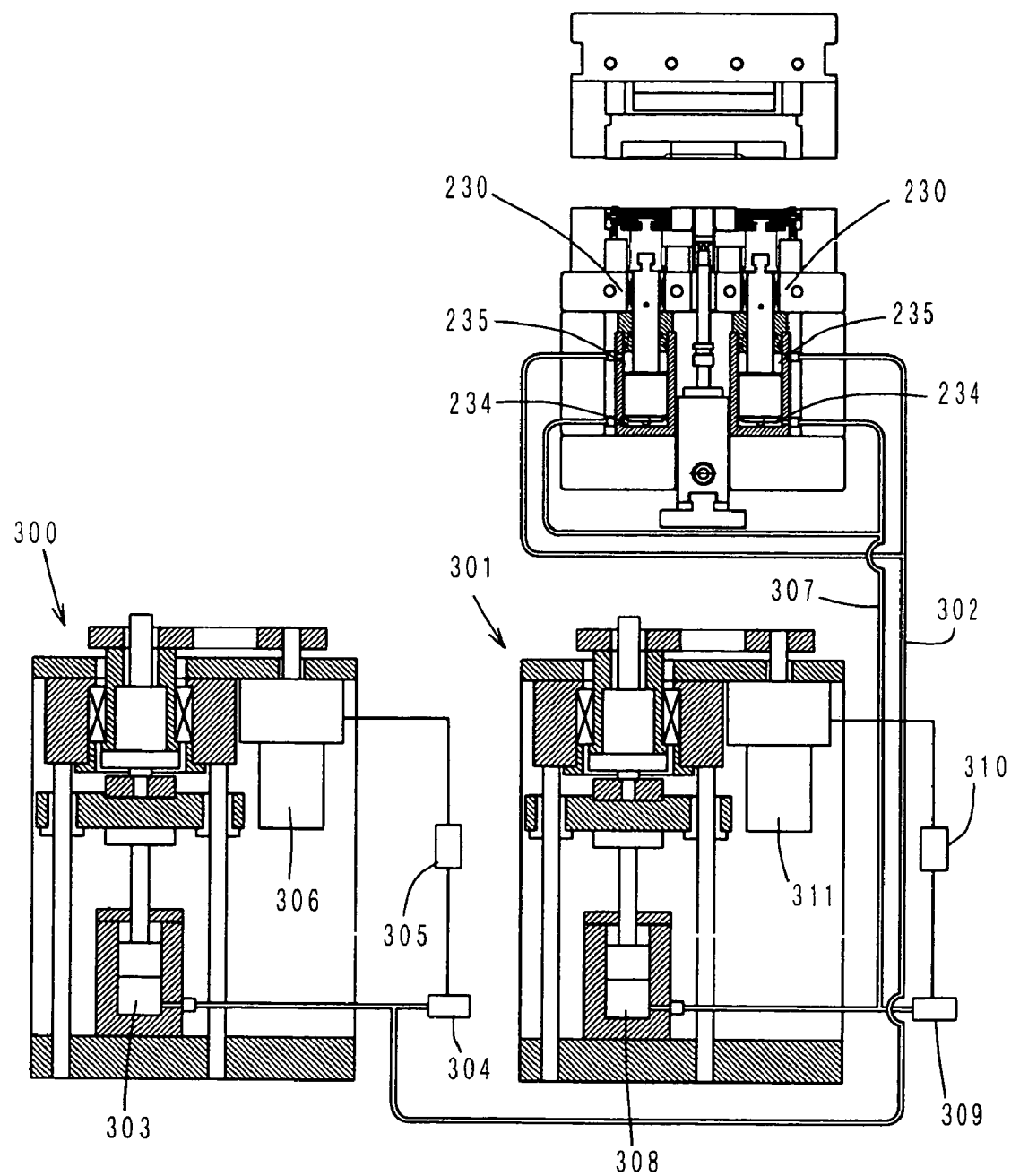
FIG. 28 is a front crossectional view of a mold apparatus for resin encapsulation in accordance with an alteration of the present embodiment.

As shown in FIG. 28, the oil pressure of the upper liquid chamber 235 and the lower liquid chamber 234 of each pressurizing cylinder 230 may be independently adjusted by separate oil pressure adjusting apparatuses 300, 301. That is, the upper liquid chamber 235 of the pressurizing cylinder 230 is in communication with the lower liquid chamber 303 of the oil pressure adjusting apparatus 300 via a hose 302. A pressure sensor 304 is provided in the middle of the hose 302, thereby detecting the oil pressure of the upper liquid chamber 235 of the pressurizing cylinder 230, thereby inputting it to a controlling apparatus 305. The controlling apparatus 305 controls and drives a servo motor 306 depending on the detected pressure. Similarly, the lower liquid chamber 234 of the pressurizing cylinder 230 is in communication with the lower liquid chamber 308 of the oil pressure adjusting apparatus 301 via a hose 307. A pressure sensor 309 is provided in the middle of the hose 307, thereby detecting the oil pressure of the lower liquid chamber 234 of the pressurizing cylinder 230. A controlling apparatus 310 similarly controls and drives a servo motor 311.

As such, during the extrusion and the retraction of the piston 233 of the pressurizing cylinder 230, a desired oil pressure can be obtain in each liquid chamber 234, 235, permitting a smooth and fast operation.

Although the clamping force is increased immediately to a predetermined pressure in said first and second clamping process, a multi-step control may be used.

INDUSTRIAL AVAILABILITY

The present invention is applicable to a mold apparatus for resin encapsulation and a method of resin encapsulation used for encapsulating an mounted component, such as a semiconductor device, with resin.

The invention claimed is:

1. In a mold apparatus for resin encapsulation, wherein a substrate board is clamped by both an upper mold disposed in the lower surface of an upper mold set and a lower mold disposed in the upper surface of a lower mold set, wherein a plunger provided in any one of said mold sets is extruded whereby solid resin for encapsulation is fluidified, and wherein an electronic component mounted on the surface of said substrate board is encapsulated with the resin, a mold apparatus for resin encapsulation, wherein any one of said molds is supported directly by plural independent pistons provided in parallel, and wherein said pistons are inserted slidably within an oil hydraulic cylinder block provided in said mold set to be able to compensate for substrate boards having varying thicknesses.

2. In a mold apparatus for resin encapsulation, wherein a substrate board is clamped by both an upper mold disposed in the lower surface of an upper mold set and a lower mold disposed in the upper surface of a lower mold set, wherein a plunger provided in the lower mold set is extruded whereby solid resin for encapsulation is fluidified, and wherein an electronic component mounted on the surface of said substrate board is encapsulated with the resin, a mold apparatus for resin encapsulation, wherein said lower mold is supported directly by each of plural independent pistons provided in parallel, and wherein the lower end sections of said pistons are inserted slidably within an oil hydraulic cylinder block provided in said lower mold set to be able to compensate for substrate boards having varying thicknesses.

3. A mold apparatus for resin encapsulation of claim 2, wherein the oil hydraulic cylinder block is clamped by a base plate and a base plate for chase constituting the top and the bottom of the lower mold set.

4. A mold apparatus for resin encapsulation of claim 2 or 3, wherein the lower mold supported by the pistons is attachable onto and detachable from the upper surface of said lower mold set.

5. In a mold apparatus for resin encapsulation, wherein a substrate board is clamped by both an upper mold disposed in the lower surface of an upper mold set and a lower mold disposed in the upper surface of a lower mold set, wherein a plunger provided in any one of said mold sets is extruded whereby solid resin for encapsulation is fluidified, and wherein an electronic component mounted on the surface of said substrate board is encapsulated with the resin, a mold apparatus for resin encapsulation, wherein an oil hydraulic cylinder block to which one end of each of the plural pistons supporting any one of said molds is inserted slidably is provided in any one of said upper mold set and said lower mold set so as to be changeable with a normal base block and to be able to compensate for substrate boards having varying thicknesses.

6. In a mold apparatus for resin encapsulation, wherein a substrate board is clamped by both an upper mold disposed in the lower surface of an upper mold set and a lower mold disposed in the upper surface of a lower mold set, wherein a plunger provided in any one of said mold sets is extruded whereby solid resin for encapsulation is fluidified, and wherein an electronic component mounted on the surface of said substrate board is encapsulated with the resin, a mold apparatus for resin encapsulation, wherein an oil hydraulic cylinder block to which one end of each of plural pistons supporting said lower mold is inserted slidably is provided in said lower mold set so as to be changeable with a normal base block comprising ejector rods and to be able to compensate for substrate boards having varying thicknesses.

7. A mold apparatus for resin encapsulation of claim 6, wherein an oil hydraulic cylinder block is slidably engaged to a base plate for chase constituting the lower mold set so as to be changeable with a normal base block comprising ejector rods.

8. A mold apparatus for resin encapsulation of claim 5, wherein an oil hydraulic cylinder block is slidably engaged to a base plate constituting the upper mold set so as to be changeable with a normal base block.

9. A mold apparatus for resin encapsulation of claims 6 or 7, wherein a heat insulating plate is disposed in at least one linkage section between a lower mold and a space block, a side block, or an end block constituting the lower mold set.

10. A mold apparatus for resin encapsulation of claim 6 or 7, wherein a heat insulating plate is disposed in at least one linkage section between a lower mold and a space block, a support block, or a piston of the lower chase.

11. A mold apparatus for resin encapsulation of claim 6 or 7, wherein a lower chase involving the lower mold is slidably engaged to the lower mold set so as to be attachable thereto and detachable therefrom.

12. A mold apparatus for resin encapsulation of any one of claims 5 to 7, wherein a heater is disposed in the vicinity of a pot into which solid resin for encapsulation is put.

13. A mold apparatus for resin encapsulation of claim 8, wherein a heater is disposed in the vicinity of a pot into which solid resin for encapsulation is put.

14. A mold apparatus for resin encapsulation of claim 9, wherein a lower chase involving the lower mold is slidably engaged to the lower mold set so as to be attachable thereto and detachable therefrom.

15. A mold apparatus for resin encapsulation of claim 10, wherein the lower chase involving the lower mold is slidably engaged to the lower mold set so as to be attachable thereto and detachable therefrom.

16. A mold apparatus for resin encapsulation of claim 9, wherein a heater is disposed in the vicinity of a pot into which solid resin for encapsulation is put.

17. A mold apparatus for resin encapsulation of claim 10, wherein a heater is disposed in the vicinity of a pot into which solid resin for encapsulation is put.

18. A mold apparatus for resin encapsulation of claim 11, wherein a heater is disposed in the vicinity of a pot into which solid resin for encapsulation is put.

19. A mold apparatus for resin encapsulation of any one of claims 5 to 7, wherein a heater is disposed in the vicinity of a pot into which solid resin for encapsulation is put, wherein the plural pistons provided in parallel are linked by a synchronization bar.

20. A mold apparatus for resin encapsulation of claim 8, wherein a heater is disposed in the vicinity of a pot into which solid resin for encapsulation is put, wherein the plural pistons provided in parallel are linked by a synchronization bar.

* * * * *